United States Patent
Yoshida et al.

(10) Patent No.: US 6,617,048 B1
(45) Date of Patent: Sep. 9, 2003

(54) PREPAINTED STEEL SHEET AND METHOD FOR PRODUCING THE SAME

(75) Inventors: Keiji Yoshida, Yokohama (JP); Kazumi Ito, Kawasaki (JP); Masaaki Yamashita, Fukuyama (JP); Hiroyuki Kato, Kawasaki (JP); Yasuhiro Toyoda, Yokohama (JP); Yasuyuki Kajita, Kawasaki (JP); Susumu Ogawa, Ootawara (JP); Nobuyoshi Kato, Tochigi-ken (JP)

(73) Assignees: NKK Corporation, Tokyo (JP); Dai Nippon Toryo Co., Ltd., Osaka (JP)

( * ) Notice: Subject to any disclaimer, the term of this patent is extended or adjusted under 35 U.S.C. 154(b) by 0 days.

(21) Appl. No.: 09/535,331

(22) Filed: Mar. 27, 2000

(30) Foreign Application Priority Data

| Mar. 30, 1999 | (JP) | ............................................ 11-087516 |
| Jun. 29, 1999 | (JP) | ............................................ 11-183072 |

(51) Int. Cl.⁷ .......................... B32B 15/08; B32B 15/18; B05D 3/02
(52) U.S. Cl. ........................ 428/626; 428/659; 428/334; 428/339; 428/416; 428/458; 427/385.5; 427/388.1

(58) Field of Search ................................. 428/623, 624, 428/626, 658, 659, 666, 667, 681, 220, 332, 334, 339, 416, 425.8, 457, 458, 460, 461, 474.4, 480, 524; 427/372.2, 384, 385.5, 388.1, 388.2, 388.5

(56) References Cited

U.S. PATENT DOCUMENTS

| 5,563,223 A | * | 10/1996 | Tachika et al. ............. 525/437 |
| 5,883,170 A | * | 3/1999 | Tanaka et al. .............. 524/413 |
| 6,413,648 B1 | * | 7/2002 | Heyenk et al. ............. 428/482 |
| 6,451,932 B1 | * | 9/2002 | Wang et al. ................ 525/523 |

FOREIGN PATENT DOCUMENTS

| JP | 8-100150 A | 4/1996 |
| JP | 9-111183 A | 4/1997 |

* cited by examiner

*Primary Examiner*—Michael La Villa
(74) *Attorney, Agent, or Firm*—Frishauf, Holtz, Goodman & Chick, P.C.

(57) ABSTRACT

A prepainted steel sheet has a chemically conversion-treated zinc-plated steel sheet and a coating formed on the surface of said zinc-plated steel sheet. The coating is formed by painting and baking of a solvent-type-paint composition. The paint composition contains a polyester resin.

20 Claims, No Drawings

PREPAINTED STEEL SHEET AND METHOD FOR PRODUCING THE SAME

BACKGROUND OF THE INVENTION

1. Field of the Invention

The present invention relates to a prepainted steel sheet and a method for preparation thereof. The prepainted steel sheet of the present invention is used as materials of, for example, household electric appliances such as a refrigerator and a fan heater, building materials and automobile parts.

2. Description of the Related Arts

The prepainted steel sheet usually used is painted in two-coat. Such type of prepainted steel sheet maintains adhesiveness to a base steel sheet, corrosion resistance and the like by mainly using a modified polyester resin or an epoxy resin as a primer, and gives mainly contamination-resistance, design-ability, flaw-resistance, barrier property and the like by using polyester and acrylic paints as a topcoat paint. On the other hand, since preparation of two-coat-prepainted steel sheet needs many processes when painting and baking, it takes longer time for them. Therefore, one-coat coating and thin coating are desirable from the viewpoints of rationalization of painting work and conservation of resources.

However, when using a paint itself for a conventional prepainted steel sheet as one-coat in solvent-type-paint, use of a primer only is insufficient for contamination-resistance, design-ability and the like, while use of topcoat paint only is insufficient for adhesiveness to a base steel sheet and corrosion resistance. In addition, a one-coat-painting steel sheet with a powder paint has been already manufactured, there are, however, drawbacks that the powder paint thickens the coating and takes longer time to cure.

Accordingly, it is required to design a thin coating film which has both functions of a primer layer and a topcoat layer of a two-coat-prepainted steel sheet and is capable of curing in a short time in order to adopt a one-coat-prepainted steel sheet by a solvent-type paint, considering rationalization of the painting work, the resource-saving and the like.

Incidentally, the prepainted steel sheet requires various properties such as high hardness, high workability, contamination-resistance, chemical resistance, water-resistance, corrosion resistance and the like. Among them, the molding workability is extremely important capability for the prepainted steel sheet to perform molding process after painting and baking. Herein, molding workability means that there is little damage of coating in processes such as bending, drawing and cutting when processing to different shapes from a planar metal sheet. In a molding process such as relatively mild bending process, the higher the degree of the spread and softening of coating itself are, the better the workability becomes. Further, in severe molding process such as drawing process, it becomes significant to have the strength endurable to deformation or stress when processing and flaw-resistance as well as spread and softness of the coating.

To such required properties of the prepainted steel sheet, for example, a paint composition combining a specific polyester resin, a melamine resin (curing agent) and the like and a painted steel sheet by use thereof have been proposed in Japanese Unexamined Patent Publication No. 8-100150 in order to obtain the coating excellent in hardness, contamination-resistance and weather resistance.

It has been also proposed in Japanese Unexamined Patent Publication No. 9-111183 that another painted steel sheet fulfils workability, corrosion resistance, adhesiveness, shock resistance, scratch-resistance and design-ability by being painted with a paint composition combined with a polyester resin, a melamine resin (a curing agent), a rust preventive pigment, an organic polymeric microparticles and the like, However, in the art of Japanese Unexamined Patent Publication No. 8-100150 of such prior arts, the polyester resin has not been designed so as to obtain a strong coating endurable to stress when molding a severe process such as a drawing process in one-coat, resulting in insufficient molding workability.

Also in the art of Japanese Unexamined Patent Publication No. 9-111183, the polyester resin has not been designed so as to obtain a strong coating endurable to stress when molding a severe process such as a drawing process in one-coat, resulting in insufficient molding workability.

SUMMARY OF THE INVENTION

It is an object of the present invention to provide a one-coat-prepainted steel sheet and a method for producing the same of which hardly generate flaws to a severe working process such as drawing process and enable fast operations when manufacturing.

To attain the object, first, the present invention provides the one-coat-prepainted steel sheet comprising a chemically conversion-treated zinc-plated steel sheet and a coating containing polyester resin (A) and melamine resin (D) formed on the surface of said zinc-plated steel sheet.

A thickness of dried film of said coating is not more than 10 $\mu$m. Said coating is formed by painting and baking of a solvent-type-paint composition composed of 100 parts by weight (a ratio of solid content) of polyester resin (A) and 5–30 parts by weight (a ratio of solid content) of melamine resin (D) as main components.

Said polyester resin (A) has a number-average molecular weight of 5000–25000, a glass transition temperature of 20–80° C., a hydroxyl value of 3–30 KOH mg/g, and an acid value of 0–10 KOH mg/g. A 20–70 mol % of polyalcohol components in polyester resin (A) is cyclohexanedimethanol.

Secondly, the present invention provides the one-coat-prepainted steel sheet comprising a chemically conversion-treated zinc-plated steel sheet and a coating containing polyester resin (A), epoxy resin (B) and melamine resin (D) formed on the surface of said zinc-plated steel sheet.

A thickness of dried film of said coating is not more than 10 $\mu$m. Said coating is formed by painting and baking of a solvent-type-paint composition composed of 100 parts by weight (a ratio of solid content) of polyester resin (A), 5–25 parts by weight (a ratio of solid content) of epoxy resin (B) having 180–1000 epoxy equivalents, and 5–30 parts by weight (ratio of solid content) of melamine resin (D) as main components.

Said polyester resin (A) has a number-average molecular weight of 5000–25000, a glass transition temperature of 20–80° C., a hydroxyl value of 3–30 KOH mg/g, and an acid value of 0–10 KOH mg/g.

20–70 mol % of polyalcohol components in polyester resin (A) is cyclohexanedimethanol.

The first and second one-coat-prepainted steel sheets are produced by a method comprising the steps of:

painting a solvent-type-paint composition on the surface of a chemically conversion-treated zinc-plated steel sheet; and forming a curing coating by baking a painted paint composition on said plated steel sheet at 200–250° C. of an reaching sheet temperature in 20–90 sec of baking time.

Thirdly, the present invention provides the one-coat-prepainted steel sheet comprising a chemically conversion-treated zinc-plated steel sheet and a coat containing polyester (A) and a curing agent formed on the surface of said zinc-plated steel sheet.

A thickness of dried film of said coating is not more than 10 μm. Said coating is formed by painting and baking of a solvent-type-paint composition composed of 100 parts by weight (a ratio of solid content) of polyester resin (A) and 3–20 parts by weight (a ratio of solid content) of a curing agent as main components.

Said curing agent containing blocked polyisocyanate compound (C) and melamine resin (D) is composed of a mixing weight ratio (C)/(D) of 100/0–15/85 in the solid content.

Said polyester resin (A) has a number-average molecular weight of 5000–25000, a glass transition temperature of 20–80° C., a hydroxyl value of 3–30 KOH mg/g, and an acid value of 0–10 KOH mg/g.

A 20–70 mol % of polyalcohol components in polyester resin (A) is cyclohexanedimethanol.

Fourthly, the present invention provides the one-coat-prepainted steel sheet comprising a chemically conversion-treated zinc-plated steel sheet and a coating containing polyester resin (A), epoxy resin (B) and a curing agent formed on the surface of said zinc-plated steel sheet.

A thickness of dried film of said coating is not more than 10 μm. Said coating is formed by painting and baking of a solvent-type-paint composition composed of 100 parts by weight (a ratio of solid content) of polyester resin (A), 5–25 parts by weight (a ratio of solid content) of epoxy resin (B) having 180–1000 epoxy equivalents, and 3–20 parts by weight (a ratio of solid content) of a curing agent as main components.

Said curing agent containing blocked polyisocyanate compound (C) and melamine resin (D) is composed of a mixing weight ratio (C)/(D) of 100/0–15/85 in the solid content.

Said polyester resin (A) has a number-average molecular weight of 5000–25000, a glass transition temperature of 20–80° C., a hydroxyl value of 3–30 KOH mg/g, and an acid value of 0–10 KOH mg/g.

20–70 mol % of polyalcohol components in polyester resin (A) is cyclohexanedimethanol.

The third and fourth one-coat-prepainted steel sheets are produced by a method comprising the steps of:

painting a solvent-type-paint composition on the surface of a chemically conversion-treated zinc-plated steel sheet; and forming a curing coat by baking a painted paint composition on said plated steel sheet at 200–250° C. of an reaching sheet temperature in 20–90 sec of baking time.

DESCRIPTION OF THE EMBODIMENT

EMBODIMENT 1

The present inventors found that a one-coat-prepainted steel sheet excellent in molding workability and fast operation is obtained by forming a coating painted directly with a solvent-type-paint composition composed of a polyester resin having a specific property, a specific epoxy resin in order to improve adhesiveness to a base steel sheet combined if necessary, and a melamine resin of a curing agent as main components, on the surface of a chemically conversion-treated zinc-plated steel sheet.

EMBODIMENT 1 is conducted on the basis of such findings and the characteristic constitution is as follows:

[1] A one-coat-prepainted steel sheet excellent in molding workability wherein thickness of the dried film is not more than 10 μm which is formed by painting and baking of a solvent-type-paint composition comprising: 100 parts by weight (a ratio of solid content) of polyester resin (A) having a number-average molecular weight of 5000–25000, a glass transition temperature of 20–80° C., a hydroxyl value of 3–30 KOH mg/g and an acid value of 0–10 KOH mg/g; 5–30 parts by weight (a ratio of solid content) of a melamine resin (D), as main components; and 20–70 mol % cyclohexanedimethanol of polyalcohol components in the polyester resin (A), on the surface of a chemically conversion-treated zinc-plated steel sheet.

[2] The one-coat-prepainted steel sheet excellent in molding workability wherein thickness of the dried film is not more than 10 μm which is formed by painting and baking of a solvent-type-paint composition comprising: 100 parts by weight (a ratio of solid content) of polyester resin (A) having a number-average molecular weight of 5000–25000, a glass transition temperature of 20–80° C., a hydroxyl value of 3–30 KOH mg/g and an acid value of 0–10 KOH mg/g; 5–25 parts by weight (a ratio of solid content) of an epoxy resin (B) of 180–1000 epoxy equivalents; 5–30 parts by weight (a ratio of solid content) of a melamine resin (D), as main components; and 20–70 mol % cyclohexanedimethanol of polyalcohol components in the polyester resin (A), on the surface of a chemically conversion-treated zinc-plated steel sheet.

[3] The one-coat-prepainted steel sheet excellent in molding workability as described in the above [1] or [2] wherein polyester resin (A) in the solvent-type-paint composition, which is obtained by modifying a part of hydroxyl groups with carboxylic acids after condensation polymerization of polybasic acids with polyalcohols, has an acid value of 3–10 KOH mg/g.

[4] A method for preparing the one-coat-prepainted steel sheet excellent in molding workability as described in any of the above [1]–[3] wherein a curing coat is formed by conducting a short time baking in 20–90 sec of baking time at 200–250° C. of a reaching sheet temperature after painting a solvent-type-paint composition on the surface of a chemically conversion-treated zinc-plated steel sheet.

Hereinafter, the details of EMBODIMENT 1 and the reasons for limitation are illustrated.

In the one-coat-prepainted steel sheet in EMBODIMENT 1, the coat painted directly with a solvent-type-paint composition composed of polyester resin (A) having a specific property, epoxy resin (B) in order to improve adhesiveness to a base steel sheet combined if necessary, and a melamine resin (D) of a curing agent, as main components, on the surface of a chemically conversion-treated zinc-plated steel sheet, is formed.

For the zinc-plated steel sheet which will be the base steel sheet of the prepainted steel sheet in EMBODIMENT 1, one can use different zinc-plated steel sheets, for example, such as a fused-zinc-plated steel sheet, a zinc-electroplated steel sheet, an alloy-fused-zinc-plated steel sheet, an aluminum-zinc-alloy-plated steel sheet (for example, a fused-zinc-55% aluminum-alloy-plated steel sheet, a fused-zinc-5% aluminum-alloy-plated steel sheet), an iron-zinc-alloy-plated steel sheet, and a nickel-zinc-alloy-plated steel sheet.

In order to improve the coating adhesiveness and the corrosion resistance, it is necessary to conduct chemical conversion treatment on the surface of said zinc-plated steel sheet prior to painting. The chemical conversion-treating agents include phosphates, chromates and the like by which a chemically conversion-treated film is formed on the surface of the plated film.

In the prepainted steel sheet in EMBODIMENT 1, the one-coat coating is formed by painting and baking with a specific solvent-type-paint composition on the surface of said chemically conversion-treated zinc-plated steel sheet.

Polyester (A), epoxy resin (B) and melamine resin (D) which are main components of the solvent-type-paint composition so as to form this coat are illustrated as follows.

Polyester resin (A): polyester resin (A) which is combined in the solvent-type-paint composition is required to have properties such as a number-average molecular weight of 5000–25000, preferably 10000–22000, a glass transition temperature Tg of 20–80° C., preferably 30–70° C., a hydroxyl value of 3–30 KOH mg/g, preferably 4–20 KOH mg/g, and an acid value of 0–10 KOH mg/g, preferably 3–9 KOH mg/g.

When polyester resin (A) has a number-average molecular weight of less than 5000, elongation of the coat is insufficient, resulting in reduction of its workability. Besides, such a resin reduces properties such as processing adhesiveness and corrosion resistance. On the other hand, if the number-average molecular weight exceeds 25000, the paint composition becomes highly viscous and in need of an excess diluting solvent, resulting in a smaller ratio of the resin present in the paint. Thus, it cannot give an appropriate coating, besides it reduces affinity with other components combined in the paint.

Polyester resin (A) having a glass transition temperature Tg of less than 20° C. decreases strength of the coating, resulting in failure of giving sufficient molding workability in one-coat coating at presswork and the like. In addition, properties such as coating hardness, processing adhesiveness and corrosion resistance after molding process are reduced, while if it exceeds 80° C., the workability reduces.

Polyester resin (A) having a hydroxyl value of less than 3 KOH mg/g generates an insufficient crosslinking reaction, resulting in lowering the coating hardness, while if it exceeds 30 KOH mg/g, the workability reduces.

If an acid value of polyester resin (A) exceeds 10 KOH mg/g, it reduces affinity with other components combined in the paint.

Said polyester resin (A) is obtained by condensation polymerization of polybasic acids with polyalcohols using a conventional method. If free carboxyl groups of generated polyester resin (A) are extremely a few and the acid value is low, it is possible to further improve the adhesiveness to the base and to further raise the curing speed by increasing the acid value of not less than 3 KOH mg/g (but, within 10 KOH mg/g), modifying a part of the hydroxyl groups with carboxylic acids. Said polybasic acid typically includes terephthalic acid, isophthalic acid, phthalic acid, succinic acid, adipic acid, sebacic acid, malonic acid, oxalic acid, trimellitic acid or the like, or lower alkyl esters of them or acid anhydrides of them, etc.

Also, by controlling the ratio of cyclohexanedimethanol among polyalcohol components of said polyester resin (A) within 20–70 mol %, a stronger and highly elastic coat is obtained to enable to further improve the molding workability and solvent-resistance. In addition, an alicyclic group, cyclohexanedimethanol has especially higher endurance to light to enable to further improve weather-resistance. Herein, in EMBODIMENT 1, 1,4-cyclohexanedimethanol is most preferable among 1,2-, 1,3- and 1,4-isomers of cyclohexanedimethanol because it gives particularly the good molding workability.

Among polyalcohol components, cyclohexanedimethanol of less than 20 mol % cannot give a strong coat, and reduces solvent-resistance and corrosion resistance after molding process. On the other hand, if cyclohexanedimethanol exceeds 70 mol %, the coat becomes harder, resulting in reduction of the workability.

Another polyalcohol components except the above one include typically ethylene glycol, 1,4-butanediol, 1,6-hexanediol, diethylene glycol, neopentyl glycol or the like.

Epoxy resin (B): epoxy resin (B) combined in the solvent-type-paint composition is combined so as to improve adhesiveness to the base and the epoxy equivalents of 180–1000, preferably 200–900 are used.

If the epoxy equivalents of epoxy resin (B) are less than 180, the coating hardness reduces, while if they exceed 1000, affinity with the polyester resin reduces. For said epoxy resin (B), one may use an epoxy resin used usually for paint such as a bisphenol A type epoxy resin, a bisphenol F type epoxy resin, a phenol-novolac type epoxy resin, an ortho-cresol-novolac type epoxy resin or the like.

Melamine resin (D): melamine resin (D) combined as a curing agent in the solvent-type-paint composition is given by etherifying the part or total of methylol groups of a product obtained by condensation of melamine with formaldehyde, with a lower alcohol such as methanol, ethanol, butanol or the like.

The combination ratios of polyester resin (A), epoxy resin (B) and melamine resin (D) in the paint composition prescribes that the epoxy resin is preferably 5–25 parts by weight, more preferably 5–20 parts by weight and the melamine resin is 5–30 parts by weight, more preferably 10–25 parts by weight, to 100 parts by weight of the polyester resin in ratios of the solid contents. Even when the epoxyres in is not combined or combined in a small amount (less than 5 parts by weight to 100 parts by weight of the polyester resin) not as a main component, properties such as good workability, solvent-resistance and corrosion resistance after molding process can be also obtained. Further, coating hardness and processing adhesiveness can be improved in addition to said capability by combination of not less than 5 parts by weight of the epoxy resin to 100 parts by weight of the polyester resin. On the other hand, when the combination amount of the epoxy resin exceeds 25 parts by weight to 100 parts by weight of the polyester resin, such a composition reduces properties such as workability, processing adhesiveness, weather resistance and corrosion resistance after molding process. In addition, when the combination amount of melamine resin is less than 5 parts by weight to 100 parts by weight of the polyester resin, such a composition lowers the properties such as coating hardness and contamination resistance, while when it exceeds 30 parts by weight, such a composition lowers the properties such as workability, processing adhesiveness and corrosion resistance after molding process.

The paint composition used in EMBODIMENT 1 can use a curing catalyst if necessary, so as to accelerate a crosslinking reaction of the resin. The usable curing agent includes typically an acid or-its neutralized substance, for example, such as p-toluenesulfonic acid, dodecylbenzenesulfonic acid, dinonylnaphthalenesulfonic acid, and amine-neutralized substances of them. Using these curing catalysts enable the crosslinking in a short time and improvement of the operation when preparing.

The combination amount of the curing catalyst is appropriately in a range of 0.1–2 parts by weight to the total 100 parts by weight of said polyester resin (A), epoxy resin (B) and melamine resin (D) in a ratio of active components.

The paint composition used in EMBODIMENT 1, if necessary, may properly combine a pigment, a lubricant, a dispersant, an antioxidant, a leveling agent, an antifoamer and the like, used usually in the painting area.

When using particularly the above paint composition, the one which is dissolved in organic solvents is used. As for the organic solvents used, the different solvents used usually for paint include, for example, methyl ethyl ketone, methyl isobutyl ketone, cyclohexanone, toluene, xylene, methyl cellosolve, butyl cellosolve, cellosolve acetate, butyl cellosolve acetate, carbitol, ethyl carbitol, butyl carbitol, ethyl acetate, butyl acetate, petroleum ether, petroleum naphtha, etc.

The combination amount of the organic solvent is required as an appropriate amount so as to control the painting viscosity of 40–200 sec (Ford cup No. 4/room temperature), matching the painting operation.

The above constitution is the paint composition used in EMBODIMENT 1. In addition, a conventional dispersing-machine and a kneading machine such as a sand grind mill, a ball mill and blender are optionally selected and used to enable to combine each component when preparing the paint composition. The degree of pigment dispersion of the paint combined in this way is suitably controlled in not more than 25 $\mu$m by the grind gauge A method.

The curing coat is formed by painting and baking the above paint composition, besides thickness of the dried film of this coat should be controlled in not more than 10 $\mu$m. The coat of the prepainted steel sheet in EMBODIMENT 1 is intended as a coating design for one-coat thin film, and has a coating capability endurable sufficiently to severe molding process even it is one-coat and has a film thickness of not more than 10 $\mu$m. In addition, thinning of the coat is extremely advantageous in cost performance. Although the minimum of dried film thickness of the coat is not specifically limited, generally it is preferably not less than 2 $\mu$m.

Next, illustrating a method for preparing the one-coat-prepainted steel sheet in EMBODIMENT 1, the prepainted steel sheet in EMBODIMENT 1 is prepared by conducting said chemical conversion treatment on the surface of the zinc-plated steel sheet which is the steel sheet to be painted, followed by painting and baking of said solvent-type-paint composition.

A method for painting the solvent-type-paint composition is not specifically limited, however, the application by a roll coater painting is preferable. After painting the solvent-type-paint composition, the curing coat is obtained by baking the coat by means of heating such as hot-air drying, infrared heating or dielectric heating followed by crosslinking the resin. As for the baking conditions, the short time baking is preferable at 200–250° C. of a baking temperature (a reaching sheet temperature) in 20–90 sec of baking time, thereby the curing coating is formed to manufacture a one-coat-prepainted steel sheet.

In this process, when the baking temperature is less than 200° C., the crosslinking reaction does not proceed sufficiently, resulting in failure in giving sufficient coating capability. On the other hand, when the baking temperature exceeds 250° C., deterioration of the coat by heat occurs leading to reduction of the coating capability.

Also when the baking time is less than 20 sec, the crosslinking reaction does not proceed sufficiently, resulting in failure in giving sufficient coating capability. On the other hand, when the baking time exceeds 90 sec, it becomes disadvantageous in terms of manufacturing cost.

The prepainted steel sheet in EMBODIMENT 1 is manufactured by the one-coat-one-baking procedure. For the purpose of enhancing further the corrosion resistance of the prepainted steel sheet, painting of the paint composition on the back of the steel sheet by the similar procedure is preferable.

EXAMPLE

Inventive Examples 1–9 and Comparative Examples 1–11

According to the combination of the composition shown in Tables 1–7, a polyester resin, an epoxy resin, a melamine resin, a curing catalyst, a pigment, a solvent and the like are kneaded and dispersed to prepare the paint composition having a pigment-dispersing degree of not more than 25 $\mu$m by the grind gauge A method. In Tables 1–7, the unit of combination amount of each component is "parts by weight". This is parts by weight in a ratio of solid content except for curing catalysts and a solvents. The curing catalyst shows parts by weight of the active component.

Said paint composition was painted and baked on the back side of a fused-zinc-plated steel sheet (plating addition amount: surface/back=30/30 g/m$^2$) having a plate thickness of 0.4 mm, which had an applying type of chromate chemical conversion treatment, by a bar coater under the conditions shown in Tables 1–7. Subsequently, also on the surface of the steel sheet, the paint composition was painted and baked under the similar condition to that of the back side to give the one-coat-prepainted steel sheets in Inventive Examples 1–9 and Comparative Examples 1–11.

Conventional Example 1

The polyester type primer ("V-NITTO #160 Primer" made by Dai Nippon Toryo Co. Ltd.), which is used for a high workability type prepainted steel sheet (two-coat), was painted and baked on the back side of a fused-zinc-plated steel sheet (plating addition amount: surface/back=30/30 g/m$^2$) having plate thickness of 0.4 mm, which had an-applying type of chromate chemical conversion treatment, by a bar coater under the conditions shown in Tables 7. Subsequently, the topcoat paint used for a high workability type prepainted steel sheet (two-coat) was painted and baked on this coat. Then, also on the surface of the steel sheet, the polyester primer and the topcoat paint were painted and baked under the similar condition to that of the back Bide to give the two-coat-prepainted steel sheet in Conventional Example 1.

The various tests were performed on the prepainted steel sheets obtained as the above. Methods for evaluating the tests conducted in the present EXAMPLE are as follows.

(1) Appearance

The quality of the coating surface condition after baking was judged by visual inspection. The evaluation criteria are as follows.

◯: Not observed any of mottled, flashing, orange peel, etc.

Δ: Slightly observed mottled, flashing, orange peel, etc.

X: Observed mottled, flashing, orange peel, etc. all over the surface.

(2) Gloss

According to JIS K5400, Section 7.6, the mirror reflectivity (%) of each specimen was measured at 60°.

(3) Pencil Hardness

Using Mitsublshi's "Uni", the pencil hardness of each specimen was measured according to JIS K5400, Section 8.4.2. The critical hardness of the pencil with which the specimen was not scratched is shown.

(4) Workability

Bending a test specimen to 180° having the surface to be tested face outside at 200° C., the surface was evaluated by T number at which no crack occurs on the bent part. The T number was defined as 0T when bending to 180° with putting no sheet between the inside of the bent part, as 1T when bending with putting one sheet of the plate having the same thickness as the test specimen, as 2T for two sheets and 3T for three sheets.

(5) Processing Adhesiveness

Sticking an adhesive tape on the bent (1T) part of the test specimen used at the evaluation of said workability test, degree of peeling after detaching the adhesive tape at once was evaluated. The evaluation criteria are as follows.

○: No peeling
Δ: Slightly peeled
X: Significantly peeled (6) Solvent-Resistance

Gauze immersed in xylene was reciprocated with a charged load of 1 kg/cm² on the coating surface at 20° C. The number of reciprocating times until the base metal surface appeared was measured and defined as >50 when the base metal surface did not appear even exceeding 50 times.

(7) Weather Resistance

After performing a test for 288 hr by a sunshine carbon arc lamp type of accelerated weather test machine according to the JIS K 5400 method, mirror reflectance at 60° (60° gloss) of the testing surface was measured to evaluate the gloss retention (%). The criteria of evaluation are as follows.

○: not less than 60%
X: less than 60%

(8) Corrosion Resistance 1 After Molding Process

After performing actual press molding (cylindrical drawing), a salt water spraying test was conducted for 240 hr according to the JIS K 5400 method. Then, an adhesive tape was stuck on the side of the cylinder followed by detaching it at once, and the degree of peeling was evaluated. The evaluation criteria are as follows.

○: No peeling
Δ: Slightly peeled
X: Significantly peeled (9) Corrosion Resistance 2 After Molding Process After performing a draw bead test accompanied with deformation and sliding, a salt water spraying test was conducted for 240 hr according to the JIS K 5400 method. Then, an adhesive tape was stuck on the side of the cylinder followed by detaching it at once, and the degree of peeling was evaluated. The evaluation criteria are as follows.

○: No peeling
Δ: Slightly peeled
X: Significantly peeled

Tables 8 and 9 show the evaluation results of the above each test. According to them, any of the one-coat-prepainted steel sheets of the Inventive Examples are excellent in molding workability, appearance, hardness to pencils, processing adhesiveness, solvent-resistance, weather resistance, and corrosion resistance after molding process. Further, sufficient capability is obtained even if baked in a short time and it is understood that this coat is very suitable for fast operation when manufacturing. Furthermore, the prepainted steel sheets of the present invention wherein the thickness of dried film of the coat is not more than 10 μm show almost similar capability to that of the conventional two-coat-prepainted steel sheet of Conventional Example 1 wherein the total thickness of dried films of the primer and the coating is 20 μm.

On the other hand, Comparative Example 1 wherein cyclohexanedimethanol is not used as a polyester resin is inferior in hardness to pencils, processing adhesiveness, solvent-resistance and corrosion resistance after molding process.

Further, Comparative Example 2 wherein an ethylene oxide additive of bisphenol A is introduced to the polyester resin framework instead of cyclohexanedimethanol is inferior in weather resistance. Also Comparative Example 3 wherein the combination amount of epoxy resin exceeds 25 parts by weight is inferior in workability, processing adhesiveness, weather resistance and corrosion resistance after molding process, and Comparative Example 4 wherein the combination amount of melamine resin exceeds 30 parts by weight is inferior in workability, processing adhesiveness and corrosion resistance after molding process, respectively.

Further, Comparative Example 5 using the polyester resin which has a number-average molecular weight of less than 5000 is inferior in workability, processing adhesiveness and corrosion resistance after molding process, while Comparative Example 6 using the polyester resin which has a glass transition temperature Tg of less than 200° C. is inferior in hardness to pencils, processing adhesiveness and corrosion resistance after molding process, respectively.

Further, Comparative Example 7 using the polyester resin wherein cyclohexanedimethanol is less than 20 mol % is inferior in solvent-resistance and corrosion resistance after molding process.

Further, Comparative Example 8 wherein the thickness of dried film of the coat exceeds 10 μm is low in fast painting, especially inferior in appearance.

Furthermore, Comparative Example 9 wherein the baking temperature is less than 200° C. is inferior in hardness to pencils, processing adhesiveness, solvent-resistance and corrosion resistance after molding process, Comparative Example 10 wherein the baking temperature exceeds 250° C. is inferior in appearance, workability, processing adhesiveness and corrosion resistance after molding process, and Comparative Example 11 wherein the baking time is less than 20 sec is inferior in hardness to pencils, processing adhesiveness, solvent-resistance and corrosion resistance after molding process, respectively.

Herein, *1–*12 in Tables 1–7 mean the following contents.

*1 The polyester resins of No. 1–No. 8 use terephthalic acid, isophthalic acid and adipic acid as polybasic acids, ethylene glycol and CHDM as polyalcohols, respectively. After condensation polymerization of them, the hydroxyl groups were modified by trimellitic anhydride. The polyester resin of No. 9 uses terephthalic acid, isophthalic acid and adipic acid as polybasic acids, ethylene glycol and BPA as polyalcohols, respectively. After condensation polymerization of them, the hydroxyl groups were modified by trimellitic anhydride. The polyester resin of No. 10 uses terephthalic acid, isophthalic acid and sebacic acid as polybasic acids, ethylene glycol and neopentyl glycol as polyalcohols, respectively, and those were condensed and polymerized.

*2 Mn: number-average molecular weight (measured based on ASTM D-3536-91)

*3 Tg: glass transition temperature (measured based on JIS K 7121 4. 2 (2) [heat flux differential scanning calorimetry]

*4 CHDM: 1,4-cyclohexanedimethanol

*5 BPA: ethylene oxide additive of bisphenol A

*6 Bisphenol A type resin (epoxy equivalents 500)

*7 Methyl etherification

*8 Morpholine-blocked form of dodecylbenzenesufonic acid

*9 Titanium dioxide

*10 Strontium chromate

*11 A mixed solvent composed of 50:40:10 of sorbesso #150, cyclohexanone, and isophorone

*12 Reaching sheet temperature

As mentioned above, the prepainted steel sheet in EMBODIMENT 1 is a one-coat-prepainted steel sheet painted directly with a paint composition on the surface of a chemically conversion-treated zinc-plated steel sheet not mediated by a primer, and this plate has excellent molding workability, appearance, coating hardness, processing adhesiveness, solvent-resistance, weather resistance, and corrosion resistance after molding process although the thickness of the coat is not more than 10 μm. Therefore, this is extremely useful as a prepainted steel sheet used for parts where molding process is required in the use of electric appliances and the like.

Moreover, since the prepainted steel sheet of EMBODIMENT 1 has the coating thickness of not more than 10 μm in one-coat and is capable of being baked in a short time, more simplicity of painting process, faster operation and more saving of resources become possible leading to extremely industrial usefulness.

TABLE 1

| Polyester | | Mn | Tg (° C.) | Hydroxyl value | Acid value | CHDM (mol %) | BPA (mol %) | Example | | |
|---|---|---|---|---|---|---|---|---|---|---|
| *1 | No. | *2 | *3 | (KOH mg/g) | (KOH mg/g) | *4 | *5 | 1 | 2 | 3 |
| | 1 | 15000 | 50 | 5 | 6 | 50 | — | 100 | 100 | 100 |
| | 2 | 3000 | 50 | 37 | 6 | 50 | — | — | — | — |
| | 3 | 10000 | 50 | 9 | 6 | 60 | — | — | — | — |
| | 4 | 15000 | 10 | 5 | 6 | 50 | — | — | — | — |
| | 5 | 15000 | 70 | 5 | 6 | 30 | — | — | — | — |
| | 6 | 15000 | 50 | 7 | 3 | 50 | — | — | — | — |
| | 7 | 15000 | 50 | 4 | 9 | 50 | — | — | — | — |
| | 8 | 15000 | 50 | 5 | 6 | 10 | — | — | — | — |
| | 9 | 15000 | 50 | 5 | 6 | — | 50 | — | — | — |
| | 10 | 15000 | 10 | 8 | 0.5 | — | — | — | — | — |
| Epoxy resin *6 | | | | | | | | 10 | 20 | 5 |
| Melamine resin *7 | | | | | | | | 20 | 20 | 20 |
| Curing catalyst *8 | | | | | | | | 0.5 | 0.5 | 0.5 |
| Coloring pigment *9 | | | | | | | | 99 | 107 | 91 |
| Rust preventive pigment *10 | | | | | | | | 5 | 5 | 5 |
| Solvent *11 | | | | | | | | 286 | 308 | 264 |
| Painting condition | | | | | | | | | | |
| Surface | | | | | | | | | | |
| Coating | | | | | | | | | | |
| Thickness of drying film (μm) | | | | | | | | 8 | 8 | 8 |
| Temperature (° C.) *12 | | | | | | | | 240 | 240 | 240 |
| Baking time (sec) | | | | | | | | 30 | 30 | 30 |
| Primer | | | | | | | | | | |
| Thickness of drying film (μm) | | | | | | | | — | — | — |
| Temperature (° C.) *12 | | | | | | | | — | — | — |
| Baking time (sec) | | | | | | | | — | — | — |
| Back | | | | | | | | | | |
| Coating | | | | | | | | | | |
| Thickness of drying film (μm) | | | | | | | | 8 | 8 | 8 |
| Temperature (° C.) *12 | | | | | | | | 220 | 220 | 220 |
| Baking time (sec) | | | | | | | | 30 | 30 | 30 |
| Primer | | | | | | | | | | |
| Thickness of drying film (μm) | | | | | | | | — | — | — |
| Temperature (° C.) *12 | | | | | | | | — | — | — |
| Baking time (sec) | | | | | | | | — | — | — |

TABLE 2

| Polyester | | Mn | Tg (° C.) | Hydroxyl value | Acid value | CHDM (mol %) | BPA (mol %) | Example | | |
|---|---|---|---|---|---|---|---|---|---|---|
| *1 | No. | *2 | *3 | (KOH mg/g) | (KOH mg/g) | *4 | *5 | 4 | 5 | 6 |
| | 1 | 15000 | 50 | 5 | 6 | 50 | — | 100 | — | — |
| | 2 | 3000 | 50 | 37 | 6 | 50 | — | — | — | — |
| | 3 | 10000 | 50 | 9 | 6 | 60 | — | — | 100 | — |
| | 4 | 15000 | 10 | 5 | 6 | 50 | — | — | — | — |
| | 5 | 15000 | 70 | 5 | 6 | 30 | — | — | — | 100 |
| | 6 | 15000 | 50 | 7 | 3 | 50 | — | — | — | — |

TABLE 2-continued

| Polyester *1 | No. | Mn *2 | Tg (° C.) *3 | Hydroxyl value (KOH mg/g) | Acid value (KOH mg/g) | CHDM (mol %) *4 | BPA (mol %) *5 | Example 4 | 5 | 6 |
|---|---|---|---|---|---|---|---|---|---|---|
| | 7 | 15000 | 50 | 4 | 9 | 50 | — | — | — | — |
| | 8 | 15000 | 50 | 5 | 6 | 10 | — | — | — | — |
| | 9 | 15000 | 50 | 5 | 6 | — | 50 | — | — | — |
| | 10 | 15000 | 10 | 8 | 0.5 | — | — | — | — | — |
| Epoxy resin *6 | | | | | | | | 10 | 10 | 10 |
| Melamine resin *7 | | | | | | | | 30 | 20 | 20 |
| Curing catalyst *8 | | | | | | | | 0.5 | 0.5 | 0.5 |
| Coloring pigment *9 | | | | | | | | 107 | 99 | 99 |
| Rust preventive pigment *10 | | | | | | | | 5 | 5 | 5 |
| Solvent *11 | | | | | | | | 308 | 234 | 286 |
| Painting condition | | | | | | | | | | |
| Surface | | | | | | | | | | |
| Coating | | | | | | | | | | |
| Thickness of drying film (μm) | | | | | | | | 8 | 8 | 8 |
| Temperature (° C.) *12 | | | | | | | | 240 | 240 | 240 |
| Baking time (sec) | | | | | | | | 30 | 30 | 30 |
| Primer | | | | | | | | | | |
| Thickness of drying film (μm) | | | | | | | | — | — | — |
| Temperature (° C.) *12 | | | | | | | | — | — | — |
| Baking time (sec) | | | | | | | | — | — | — |
| Back | | | | | | | | | | |
| Coating | | | | | | | | | | |
| Thickness of drying film (μm) | | | | | | | | 8 | 8 | 8 |
| Temperature (° C.) *12 | | | | | | | | 220 | 220 | 220 |
| Baking time (sec) | | | | | | | | 30 | 30 | 30 |
| Primer | | | | | | | | | | |
| Thickness of drying film (μm) | | | | | | | | — | — | — |
| Temperature (° C.) *12 | | | | | | | | — | — | — |
| Baking time (sec) | | | | | | | | — | — | — |

TABLE 3

| Polyester *1 | No. | Mn *2 | Tg (° C.) *3 | Hydroxyl value (KOH mg/g) | Acid value (KOH mg/g) | CHDM (mol %) *4 | BPA (mol %) *5 | Example 7 | 8 | 9 |
|---|---|---|---|---|---|---|---|---|---|---|
| | 1 | 15000 | 50 | 5 | 6 | 50 | — | — | — | 100 |
| | 2 | 3000 | 50 | 37 | 6 | 50 | — | — | — | — |
| | 3 | 10000 | 50 | 9 | 6 | 60 | — | — | — | — |
| | 4 | 15000 | 10 | 5 | 6 | 50 | — | — | — | — |
| | 5 | 15000 | 70 | 5 | 6 | 30 | — | — | — | — |
| | 6 | 15000 | 50 | 7 | 3 | 50 | — | 100 | — | — |
| | 7 | 15000 | 50 | 4 | 9 | 50 | — | — | 100 | — |
| | 8 | 15000 | 50 | 5 | 6 | 10 | — | — | — | — |
| | 9 | 15000 | 50 | 5 | 6 | — | 50 | — | — | — |
| | 10 | 15000 | 10 | 8 | 0.5 | — | — | — | — | — |
| Epoxy resin *6 | | | | | | | | 10 | 10 | 10 |
| Melamine resin *7 | | | | | | | | 20 | 20 | 20 |
| Curing catalyst *8 | | | | | | | | 0.5 | 0.5 | 0.5 |
| Coloring pigment *9 | | | | | | | | 99 | 99 | 99 |
| Rust preventive pigment *10 | | | | | | | | 5 | 5 | 5 |
| Solvent *11 | | | | | | | | 286 | 286 | 286 |
| Painting condition | | | | | | | | | | |
| Surface | | | | | | | | | | |
| Coating | | | | | | | | | | |
| Thickness of drying film (μm) | | | | | | | | 8 | 8 | 5 |
| Temperature (° C.) *12 | | | | | | | | 240 | 240 | 240 |
| Baking time (sec) | | | | | | | | 30 | 30 | 30 |

TABLE 3-continued

| Polyester *1 | No. | Mn *2 | Tg (° C.) *3 | Hydroxyl value (KOH mg/g) | Acid value (KOH mg/g) | CHDM (mol %) *4 | BPA (mol %) *5 | Example 7 | 8 | 9 |
|---|---|---|---|---|---|---|---|---|---|---|
| Primer | | | | | | | | | | |
| Thickness of drying film (μm) | | | | | | | | — | — | — |
| Temperature (° C.) *12 | | | | | | | | — | — | — |
| Baking time (sec) | | | | | | | | — | — | — |
| Back | | | | | | | | | | |
| Coating | | | | | | | | | | |
| Thickness of drying film (μm) | | | | | | | | 8 | 8 | 5 |
| Temperature (° C.) *12 | | | | | | | | 220 | 220 | 220 |
| Baking time (sec) | | | | | | | | 30 | 30 | 30 |
| Primer | | | | | | | | | | |
| Thickness of drying film (μm) | | | | | | | | — | — | — |
| Temperature (° C.) *12 | | | | | | | | — | — | — |
| Baking time (sec) | | | | | | | | — | — | — |

TABLE 4

| Polyester *1 | No. | Mn *2 | Tg (° C.) *3 | Hydroxyl value (KOH mg/g) | Acid value (KOH mg/g) | CHDM (mol %) *4 | BPA (mol %) *5 | Comparative example 1 | 2 | 3 |
|---|---|---|---|---|---|---|---|---|---|---|
| | 1 | 15000 | 50 | 5 | 6 | 50 | — | — | — | 100 |
| | 2 | 3000 | 50 | 37 | 6 | 50 | — | — | — | — |
| | 3 | 10000 | 50 | 9 | 6 | 60 | — | — | — | — |
| | 4 | 15000 | 10 | 5 | 6 | 50 | — | — | — | — |
| | 5 | 15000 | 70 | 5 | 6 | 30 | — | — | — | — |
| | 6 | 15000 | 50 | 7 | 3 | 50 | — | — | — | — |
| | 7 | 15000 | 50 | 4 | 9 | 50 | — | — | — | — |
| | 8 | 15000 | 50 | 5 | 6 | 10 | — | — | — | — |
| | 9 | 15000 | 50 | 5 | 6 | — | 50 | — | 100 | — |
| | 10 | 15000 | 10 | 8 | 0.5 | — | — | 100 | — | — |
| Epoxy resin *6 | | | | | | | | 10 | 10 | 30 |
| Melamine resin *7 | | | | | | | | 20 | 20 | 20 |
| Curing catalyst *8 | | | | | | | | 0.5 | 0.5 | 0.5 |
| Coloring pigment *9 | | | | | | | | 99 | 99 | 115 |
| Rust preventive pigment *10 | | | | | | | | 5 | 5 | 5 |
| Solvent *11 | | | | | | | | 286 | 286 | 330 |
| Painting condition | | | | | | | | | | |
| Surface | | | | | | | | | | |
| Coating | | | | | | | | | | |
| Thickness of drying film (μm) | | | | | | | | 8 | 8 | 8 |
| Temperature (° C.) *12 | | | | | | | | 240 | 240 | 240 |
| Baking time (sec) | | | | | | | | 30 | 30 | 30 |
| Primer | | | | | | | | | | |
| Thickness of drying film (μm) | | | | | | | | — | — | — |
| Temperature (° C.) *12 | | | | | | | | — | — | — |
| Baking time (sec) | | | | | | | | — | — | — |
| Back | | | | | | | | | | |
| Coating | | | | | | | | | | |
| Thickness of drying film (μm) | | | | | | | | 8 | 8 | 8 |
| Temperature (° C.) *12 | | | | | | | | 220 | 220 | 220 |
| Baking time (sec) | | | | | | | | 30 | 30 | 30 |
| Primer | | | | | | | | | | |
| Thickness of drying film (μm) | | | | | | | | — | — | — |
| Temperature (° C.) *12 | | | | | | | | — | — | — |
| Baking time (sec) | | | | | | | | — | — | — |

TABLE 5

| Polyester *1 | No. | Mn *2 | Tg (° C.) *3 | Hydroxyl value (KOH mg/g) | Acid value (KOH mg/g) | CHDM (mol %) *4 | BPA (mol %) *5 | Comparative example 4 | 5 | 6 |
|---|---|---|---|---|---|---|---|---|---|---|
| | 1 | 15000 | 50 | 5 | 6 | 50 | — | 100 | — | — |
| | 2 | 3000 | 50 | 37 | 6 | 50 | — | — | 100 | — |
| | 3 | 10000 | 50 | 9 | 6 | 60 | — | — | — | — |
| | 4 | 15000 | 10 | 5 | 6 | 50 | — | — | — | 100 |
| | 5 | 15000 | 70 | 5 | 6 | 30 | — | — | — | — |
| | 6 | 15000 | 50 | 7 | 3 | 50 | — | — | — | — |
| | 7 | 15000 | 50 | 4 | 9 | 50 | — | — | — | — |
| | 8 | 15000 | 50 | 5 | 6 | 10 | — | — | — | — |
| | 9 | 15000 | 50 | 5 | 6 | — | 50 | — | — | — |
| | 10 | 15000 | 10 | 8 | 0.5 | — | — | — | — | — |
| Epoxy resin *6 | | | | | | | | 10 | 10 | 10 |
| Melamine resin *7 | | | | | | | | 40 | 20 | 20 |
| Curing catalyst *8 | | | | | | | | 0.5 | 0.5 | 0.5 |
| Coloring pigment *9 | | | | | | | | 115 | 99 | 99 |
| Rust preventive pigment *10 | | | | | | | | 5 | 5 | 5 |
| Solvent *11 | | | | | | | | 330 | 156 | 286 |
| Painting condition | | | | | | | | | | |
| Surface | | | | | | | | | | |
| Coating | | | | | | | | | | |
| Thickness of drying film (μm) | | | | | | | | 8 | 8 | 8 |
| Temperature (° C.) *12 | | | | | | | | 240 | 240 | 240 |
| Baking time (sec) | | | | | | | | 30 | 30 | 30 |
| Primer | | | | | | | | | | |
| Thickness of drying film (μm) | | | | | | | | — | — | — |
| Temperature (° C.) *12 | | | | | | | | — | — | — |
| Baking time (sec) | | | | | | | | — | — | — |
| Back | | | | | | | | | | |
| Coating | | | | | | | | | | |
| Thickness of drying film (μm) | | | | | | | | 8 | 8 | 8 |
| Temperature (° C.) *12 | | | | | | | | 220 | 220 | 220 |
| Baking time (sec) | | | | | | | | 30 | 30 | 30 |
| Primer | | | | | | | | | | |
| Thickness of drying film (μm) | | | | | | | | — | — | — |
| Temperature (° C.) *12 | | | | | | | | — | — | — |
| Baking time (sec) | | | | | | | | — | — | — |

TABLE 6

| Polyester *1 | No. | Mn *2 | Tg (° C.) *3 | Hydroxyl value (KOH mg/g) | Acid value (KOH mg/g) | CHDM (mol %) *4 | BPA (mol %) *5 | Comparative example 7 | 8 | 9 |
|---|---|---|---|---|---|---|---|---|---|---|
| | 1 | 15000 | 50 | 5 | 6 | 50 | — | — | 100 | 100 |
| | 2 | 3000 | 50 | 37 | 6 | 50 | — | — | — | — |
| | 3 | 10000 | 50 | 9 | 6 | 60 | — | — | — | — |
| | 4 | 15000 | 10 | 5 | 6 | 50 | — | — | — | — |
| | 5 | 15000 | 70 | 5 | 6 | 30 | — | — | — | — |
| | 6 | 15000 | 50 | 7 | 3 | 50 | — | — | — | — |
| | 7 | 15000 | 50 | 4 | 9 | 50 | — | — | — | — |
| | 8 | 15000 | 50 | 5 | 6 | 10 | — | — | 100 | — |
| | 9 | 15000 | 50 | 5 | 6 | — | 50 | — | — | — |
| | 10 | 15000 | 10 | 8 | 0.5 | — | — | — | — | — |
| Epoxy resin *6 | | | | | | | | 10 | 10 | 10 |
| Melamine resin *7 | | | | | | | | 20 | 20 | 20 |
| Curing catalyst *8 | | | | | | | | 0.5 | 0.5 | 0.5 |
| Coloring pigment *9 | | | | | | | | 99 | 99 | 99 |
| Rust preventive pigment *10 | | | | | | | | 5 | 5 | 5 |
| Solvent *11 | | | | | | | | 286 | 286 | 286 |

TABLE 6-continued

| Polyester *1 | Mn No. *2 | Tg (° C.) *3 | Hydroxyl value (KOH mg/g) | Acid value (KOH mg/g) | CHDM (mol %) *4 | BPA (mol %) *5 | Comparative example 7 | 8 | 9 |
|---|---|---|---|---|---|---|---|---|---|
| Painting condition | | | | | | | | | |
| Surface | | | | | | | | | |
| Coating | | | | | | | | | |
| Thickness of drying film (μm) | | | | | | | 8 | 15 | 8 |
| Temperature (° C.) *12 | | | | | | | 240 | 240 | 180 |
| Baking time (sec) | | | | | | | 30 | 30 | 30 |
| Primer | | | | | | | | | |
| Thickness of drying film (μm) | | | | | | | — | — | — |
| Temperature (° C.) *12 | | | | | | | — | — | — |
| Baking time (sec) | | | | | | | — | — | — |
| Back | | | | | | | | | |
| Coating | | | | | | | | | |
| Thickness of drying film (μm) | | | | | | | 8 | 15 | 8 |
| Temperature (° C.) *12 | | | | | | | 220 | 220 | 220 |
| Baking time (sec) | | | | | | | 30 | 30 | 30 |
| Primer | | | | | | | | | |
| Thickness of drying film (μm) | | | | | | | — | — | — |
| Temperature (° C.) *12 | | | | | | | — | — | — |
| Baking time (sec) | | | | | | | — | — | — |

TABLE 7

| Polyester *1 | Mn No. *2 | Tg (° C.) *3 | Hydroxyl value (KOH mg/g) | Acid value (KOH mg/g) | CHDM (mol %) *4 | BPA (mol %) *5 | Example 10 | 11 | Conventional example 1 |
|---|---|---|---|---|---|---|---|---|---|
| | 1 | 15000 | 50 | 5 | 6 | 50 | — | 100 | 100 | — |
| | 2 | 3000 | 50 | 37 | 6 | 50 | — | — | — | — |
| | 3 | 10000 | 50 | 9 | 6 | 60 | — | — | — | — |
| | 4 | 15000 | 10 | 5 | 6 | 50 | — | — | — | — |
| | 5 | 15000 | 70 | 5 | 6 | 30 | — | — | — | — |
| | 6 | 15000 | 50 | 7 | 3 | 50 | — | — | — | — |
| | 7 | 15000 | 50 | 4 | 9 | 50 | — | — | — | — |
| | 8 | 15000 | 50 | 5 | 6 | 10 | — | — | — | — |
| | 9 | 15000 | 50 | 5 | 6 | — | 50 | — | — | — |
| | 10 | 15000 | 10 | 8 | 0.5 | — | — | — | — | 100 |
| Epoxy resin *6 | | | | | | | | 10 | 10 | — |
| Melamine resin *7 | | | | | | | | 20 | 20 | 20 |
| Curing catalyst *8 | | | | | | | | 0.5 | 0.5 | 0.5 |
| Coloring pigment *9 | | | | | | | | 99 | 99 | 99 |
| Rust preventive pigment *10 | | | | | | | | 5 | 5 | 5 |
| Solvent *11 | | | | | | | | 286 | 286 | 286 |
| Painting condition | | | | | | | | | | |
| Surface | | | | | | | | | | |
| Coating | | | | | | | | | | |
| Thickness of drying film (μm) | | | | | | | | 8 | 8 | 15 |
| Temperature (° C.) *12 | | | | | | | | 270 | 240 | 240 |
| Baking time (sec) | | | | | | | | 30 | 18 | 60 |
| Primer | | | | | | | | | | |
| Thickness of drying film (μm) | | | | | | | | — | — | 5 |
| Temperature (° C.) *12 | | | | | | | | — | — | 220 |
| Baking time (sec) | | | | | | | | — | — | 60 |
| Back | | | | | | | | | | |
| Coating | | | | | | | | | | |
| Thickness of drying film (μm) | | | | | | | | 8 | 8 | 15 |
| Temperature (° C.) *12 | | | | | | | | 270 | 220 | 220 |
| Baking time (sec) | | | | | | | | 30 | 18 | 60 |

TABLE 7-continued

| Polyester *1 | Mn No. | Tg (° C.) *2 | Hydroxyl value *3 (KOH mg/g) | Acid value (KOH mg/g) | CHDM (mol %) *4 | BPA (mol %) *5 | Example 10 | Example 11 | Conventional example 1 |
|---|---|---|---|---|---|---|---|---|---|
| Primer |
| Thickness of drying film (μm) | | | | | | | — | — | 5 |
| Temperature (° C.) *12 | | | | | | | — | — | 220 |
| Baking time (sec) | | | | | | | — | — | 60 |

TABLE 8

| | Example | | | | | | | | |
|---|---|---|---|---|---|---|---|---|---|
| Evaluation and result | 1 | 2 | 3 | 4 | 5 | 6 | 7 | 8 | 9 |
| Appearance | ○ | ○ | ○ | ○ | ○ | ○ | ○ | ○ | ○ |
| Gloss degree | 91 | 88 | 85 | 89 | 88 | 92 | 89 | 88 | 87 |
| Hardness of pencil | 2H | 2H | H | 2H | 2H | 2H | 2H | 2H | 2H |
| Workability | 1T | 1T | 1T | 1T | 1T | 1T | 1T | 1T | 1T |
| Processing adhesion | ○ | ○ | ○ | ○ | ○ | ○ | ○ | ○ | ○ |
| Solvent resistance | >50 | >50 | >50 | >50 | >50 | >50 | >50 | >50 | >50 |
| Weather resistance | ○ | ○ | ○ | ○ | ○ | ○ | ○ | ○ | ○ |
| Corrosion resistance after molding process (1) | ○ | ○ | ○ | ○ | ○ | ○ | ○ | ○ | ○ |
| Corrosion resistance after molding process (2) | ○ | ○ | ○ | ○ | ○ | ○ | ○ | ○ | ○ |

TABLE 9

| | Comparative example | | | | | | | | | | | Conventional example |
|---|---|---|---|---|---|---|---|---|---|---|---|---|
| Evaluation and result | 1 | 2 | 3 | 4 | 5 | 6 | 7 | 8 | 9 | 10 | 11 | 1 |
| Appearance | ○ | ○ | ○ | ○ | ○ | ○ | ○ | X | ○ | Δ | ○ | ○ |
| Gloss degree | 85 | 90 | 87 | 86 | 84 | 88 | 82 | 81 | 80 | 72 | 81 | 87 |
| Hardness of pencil | F | 2H | 2H | 3H | 2H | H | 2H | H | H | 2H | H | HB |
| Workability | 0T | 1T | 2T | 3T | 2T | 1T | 1T | 1T | 1T | 3T | 1T | 0T |
| Processing adhesion | Δ | ○ | Δ | X | Δ | X | ○ | Δ | X | X | X | ○ |
| Solvent resistance | 20 | >50 | >50 | >50 | >50 | >50 | 40 | >50 | 30 | >50 | 25 | >50 |
| Weather resistance | ○ | X | X | ○ | ○ | ○ | ○ | ○ | ○ | ○ | ○ | ○ |
| Corrosion resistance after molding process (1) | X | ○ | Δ | X | X | Δ | Δ | ○ | X | X | X | ○ |
| Corrosion resistance after molding process (2) | X | ○ | X | X | Δ | Δ | Δ | ○ | X | X | X | ○ |

EMBODIMENT 2

The present inventors found that a one-coat-prepainted steel sheet excellent in molding workability and fast operation is obtained by forming a coat painted directly with a solvent-type-paint composition composed of a polyester resin having a specific property, a specific epoxy resin in order to improve adhesiveness to a base steel sheet combined if necessary, and a curing agent containing blocked polyisocyanate compound (C) and melamine resin (D) composed of a mixing weight ratio (C)/(D) of 100/0–15/85 in the solid content as main components, on the surface of a chemically conversion-treated zinc-plated steel sheet.

EMBODIMENT 2 is conducted on the basis of such findings and the characteristic constitution is as follows.

[1] A one-coat-prepainted steel sheet excellent in molding workability wherein a coating has thickness of not more than 10 μm in a dried film which is formed by painting and baking of a solvent-type-paint composition comprising: 100 parts by weight (a ratio of solid content) of polyester resin (A) having a number-average molecular weight of 5000–25000, a glass transition temperature of 20–80° C., a hydroxyl value of 3–30 KOH mg/g and an acid value of 0–10 KOH mg/g, and 3–20 parts by weight (a ratio of solid content) of a curing agent containing blocked polyisocyanate compound (C) and melamine resin (D) composed of amixingweightratio (C)/(D) of 100/0–15/85inthesolidcontent, as main components; and 20–70 mol % cyclohexanedimethanol of polyalcohol components in the polyester resin (A), on the surface of a chemically conversion-treated zinc-plated steel sheet.

[2] The one-coat-prepainted steel sheet excellent in molding workability wherein the coating has thickness of not more than 10 μm in the dried film which is formed by painting and baking of a solvent-type-paint composition comprising: 100 parts by weight (a ratio of solid content) of polyester resin (A) having a number-average molecular weight of 5000–25000, a glass transition temperature of 20–80° C., a hydrokyl value of 3–30 KOH mg/g and an acid value of 0–10 KOH mg/g, 5–25 parts by weight (a ratio of solid content) of epoxy resin (B) of 180–1000 epoxy equivalents and 3–20 parts by weight (a ratio of solid content) of a curing agent containing blocked polyisocyanate compound (C) and melamine resin (D) composed of a mixing weight ratio (C)/(D) of 100/0–15/85 in the solid content, as main components; and 20–70 mol % cyclohexanedimethanol of polyalcohol components in the polyester resin (A), on the surface of a chemically conversion-treated zinc-plated steel sheet.

[3] The one-coat-prepainted steel sheet excellent in molding workability as described in the above [1] or [2] wherein polyester resin (A) in the solvent-type-paint composition, which is obtained by modifying a part of hydroxyl groups with carboxylic acids after condensation polymerization of polybasic acids with polyalcohols, has an acid value of 3–10 KOH mg/g.

[4] A method for preparing the one-coat-prepainted steel sheet excellent in molding workability as described in any of the above [1]–[3] wherein a curing coating is formed by conducting short time baking in 20–90 sec of the baking time at 200–250° C. of a reaching plate temperature after painting a solvent-type-paint composition on the surface of a chemically conversion-treated zinc-plated steel sheet.

Hereinafter, the details of EMBODIMENT 2 and the reasons for limitation are illustrated.

In the one-coat-prepainted steel sheet in EMBODIMENT 2, the coat painted directly with a solvent-type-paint composition composed of a polyester resin (A) having a specific property, a specific epoxy resin (B) in order to improve adhesiveness to a base steel sheet combined if necessary, and a curing agent containing blocked polyisocyanate compound (C) and melamine resin (D) composed of a mixing weight ratio (C)/(D) of 100/0–15/85 in the solid content, as main components, on the surface of a chemically conversion-treated zinc-plated steel sheet, is formed.

For the zinc-plated steel sheet which will be the base steel sheet of the prepainted steel sheet in EMBODIMENT 2, one can use different zinc-plated steel sheets, for example, such as a fused-zinc-plated steel sheet, a zinc-electroplated steel sheet, an alloy-fused-zinc-plated steel sheet, an aluminum-zinc-alloy-plated steel sheet (for example, a fused-zinc-55% aluminum-alloy-plated steel sheet, a fused-zinc-5% aluminum-alloy-plated steel sheet), an iron-zinc-alloy-plated steel sheet, and a nickel-zinc-alloy-plated steel sheet.

In order to improve the coating adhesiveness and the corrosion resistance, it is necessary to conduct chemical conversion treatment on the surface of said zinc-plated steel sheet prior to painting. The chemically conversion-treating agents include phosphates, chromates and the like by which a chemically conversion-treated film is formed on the surface of the plated film.

In the prepainted steel sheet in EMBODIMENT 2, the one-coat coating is formed by painting and baking with a specific solvent-type-paint composition on the surface of said chemically conversion-treated zinc-plated steel sheet.

Polyester (A), epoxy resin (B), blocked polyisocyanate compound (C) and melamine resin (D) which are main components of the solvent-type-paint composition so as to form this coat are illustrated as follows.

Polyester resin (A): polyester resin (A) which is combined in the solvent-type-paint composition is required to have properties such as a number-average molecular weight of 5000–25000, preferably 10000–22000, a glass transition temperature Tg of 20–80° C., preferably 30–70° C., a hydroxyl value of 3–30 KOH mg/g, preferably 4–20 KOH mg/g, and an acid value of 0–10 KOH mg/g, preferably 3–9 KOH mg/g.

When polyester resin (A) has a number-average molecular weight of less than 5000, elongation of the coat is insufficient, resulting in reduction of its workability. Besides, such a resin reduces properties such as processing adhesiveness and corrosion resistance. On the other hand, if the number-average molecular weight exceeds 25000, the paint composition becomes highly viscous and in need of an excess diluting solvent, resulting in a smaller ratio of the resin present in the paint. Thus, it cannot give an appropriate coat, besides it reduces affinity with other components combined in the paint.

Polyester resin (A) having a glass transition temperature Tg of less than 20° C. decreases strength of the coat, resulting in failure of giving sufficient molding workability in one-coat coating at presswork and the like. In addition, properties such as coating hardness, processing adhesiveness and corrosion resistance after molding process are reduced, while if it exceeds 80° C., the workability reduces.

Polyester resin (A) having a hydroxyl value of less than 3 KOH mg/g generates an insufficient crosslinking reaction, resulting in lowering the coating hardness, while if it exceeds 30 KOH mg/g, the workability reduces.

If an acid value of polyester resin (A) exceeds 10 KOH mg/g, it reduces affinity with other components combined in the paint.

Said polyester resin (A) is obtained by condensation polymerization of polybasic acids with polyalcohols using a conventional method. If free carboxyl groups of generated polyester resin (A) are extremely a few and the acid value is low, it is possible to further improve the adhesiveness to the base and to further raise the curing speed by increasing the acid value of not less than 3 KOH mg/g (but, within 10 KOH mg/g), modifying a part of the hydroxyl groups with carboxylic acids. Said polybasic acid typically includes terephthalic acid, isophthalic acid, phthalic acid, succinic acid, adipic acid, sebacic acid, malonic acid, oxalic acid, trimellitic acid or the like, or lower alkyl esters of them or acid anhydrides of them, etc.

Also, by controlling the ratio of cyclohexanedimethanol among polyalcohol components of said polyester resin (A) within 20–70 mol %, a stronger and highly elastic coat is obtained to enable to further improve the molding workability and solvent-resistance. In addition, an alicyclic group, cyclohexanedimethanol has especially higher endurance to light to enable to further improve weather-resistance. Herein, in EMBODIMENT 2, 1,4-cyclohexanedimethanol is most preferable among 1,2-, 1,3- and 1,4-isomers of cyclohexanedimethanol because it gives particularly the good molding workability.

Among polyalcohol components, cyclohexanedimethanol of less than 20 mol % cannot give a strong coat, and reduces solvent-resistance and corrosion resistance after molding process. On the other hand, if cyclohexanedimethanol exceeds 70 mol %, the coat becomes harder, resulting in reduction of the workability.

Another polyalcohol components except the above one include typically ethylene glycol, 1,4-butanediol, 1,6-hexanediol, diethylene glycol, neopentyl glycol or the like.

Epoxy resin (B): epoxy resin (B) combined in the solvent-type-paint composition is combined so as to improve adhesiveness to the base and the epoxy equivalents of 180–1000, preferably 200–900 are used.

If the epoxy equivalents of epoxy resin (B) are less than 180, the coating hardness reduces, while if they exceed 1000, affinity with the polyester resin reduces. For said epoxy resin (B), one may use an epoxy resin used usually for paint such as a bisphenol A type epoxy resin, a bisphenol F type epoxy resin, a phenol-novolac type epoxy resin, an ortho-cresol-novolac type epoxy resin or the like.

Blocked polyisocyanate compound (C): blocked ployisocyanate compound (C) combined as a curing agent in the solvent-type-paint composition is compounds obtained by blocking one or more polyisocyanate compounds selected from polyisocyanate compounds typically represented as hexamethylenediisocyanate, trimethylhexamethylene-diisocyanate, tolylenediisocyanate, 4,4-diphenylmethanediisocyanate, xylilenediisocyanate, isophoronediisocyanate, naphthylene-1,5-diisocyanate, hydrogenated tolylenediisocyanate, hydrogenated 4,4-diphenylmethane diisocyanate, hydrogenated xylilenediisocyanate, 4,4-methylenebis (cyclohexylisocyanate), 2,4,6-truisocyanatetoluene or the like and their derivatives, with a blocking agent such as phenol, cresol, an aromatic secondary amine, a tertiary alcohol, lactam or oxime. The one-compartment storage by using these blocked polyisocyanate compounds becomes possible so as to lead to readily use them as a paint for a prepainted steel sheet.

Melamine resin (D): melamine resin (D) combined, if necessary, as a curing agent in the solvent-type-paint composition is given by etherifying the part or total of methylol groups of a product obtained by condensation of melamine with formaldehyde, with a lower alcohol such as methanol, ethanol, butanol or the like.

In the present invention, a curing agent containing blocked polyisocyanate compound (C) and melamine resin (D) is composed of a mixing weight ratio (C)/(D) of 100/0–15/85 in ratios of the solid contents, preferably 100/0–50/50. If the mixing weight ratio (C)/(D) of blocked polyisocyanate compound (C) and melamine resin (D) is less than 15/85, the workability under a severe processing condition such as bending to 180° at a low temperature reduces unpreferably.

The combination ratio of polyester resin (A), epoxy resin (B), blocked polyisocyanate (C), and melamine resin (D) in the paint composition is prescribed as: preferably 5–25 parts by weight, more preferably 5–20 parts by weight of the epoxy resin; and 3–20 parts by weight, preferably 5–18 parts by weight of the curing agent composed of 100/0–15/85 of the mixing weight ratio (C)/(D) in the solid contents of blocked polyisocyanate (C) and melamine resin (D), to 100 parts by weight of the polyester in ratios of the solid contents. Even if the epoxy resin is not combined or if it is a small amount (less than 5 parts by weight to 100 parts by weight of the polyester resin) not as a main component even when combined, such a composition can give the properties such as good workability, solvent-resistance and corrosion resistance after molding process. Besides, the coating hardness and processing adhesiveness in addition to these capability can be improved by combining the epoxy resin of not less than 5 parts by weight to 100 parts by weight of the polyester resin. On the other hand, if the combination amount of the epoxy resin exceeds 25 parts by weight to 100 parts by weight of the polyester resin, such a composition reduces workability, processing adhesiveness, weather resistance and corrosion resistance after molding process. In addition, if the combination amount of the curing agent composed of 100/0–15/85 of the mixing weight ratio (C)/(D) in the solid contents of blocked polyisocyanate (C) and melamine resin (D) to 100 parts by weight of the polyester is less than 3 parts by weight, such a composition reduces the properties such as coating hardness and contamination-resistance, while if it exceeds 20 parts by weight, such a composition reduces properties such as workability, processing adhesiveness and corrosion resistance after molding process.

The paint composition used in EMBODIMENT 2 can use a curing catalyst if necessary, so as to accelerate a crosslinking reaction of the resin. The usable curing catalysts include typically an acid or its neutralized substance, for example, such as p-toluenesulfonic acid, dodecylbenzenesulfonic acid, dinonylnaphthalenesulfonic acid, and these amine-neutralized substances, trimethylenediamine, octenoic acid tin dilaurylate, dibutyl tin laurate, lead 2-ethylhexoate and the like. Using these curing catalysts enables the crosslinking in a short time and improvement of the operation when preparing.

The combination amount of the curing catalyst is appropriately in a range of 0.05–2 parts by weight to the total 100 parts by weight of said polyester resin (A), epoxy resin (B) and the curing agent [a curing agent composed of 100/0–15/85 of the mixing weight ratio in the solid contents of blocked polyisocyanate compound (C) and melamine resin (D)] in ratios of the active components.

The paint composition used in EMBODIMENT 2, if necessary, may properly combine a pigment, a lubricant, a dispersant, an antioxidant, a leveling agent, an antifoamer and the like, used usually in the painting area.

When using particularly the above paint composition, the one which is dissolved in organic solvents is used. As for the organic solvents used, the different solvents used usually for paint include, for example, methyl ethyl ketone, methyl isobutyl ketone, cyclohexanone, toluene, xylene, methyl cellosolve, butyl cellosolve, cellosolve acetate, butyl cellosolve acetate, carbitol, ethyl carbitol, butyl carbitol, ethyl acetate, butyl acetate, petroleum ether, petroleum naphtha, etc.

The combination amount of the organic solvent uses an appropriate amount so as to control the painting viscosity of 40–200 sec (Ford cup No. 4/room temperature), matching the painting operation.

The above constitution is the paint composition used in EMBODIMENT 2. In addition, a conventional dispersing machine and a kneading machine such as a sand grind mill, a ball mill and blender are optionally selected and used to enable to combine each component when preparing the paint composition. The degree of pigment dispersion of the paint combined in this way is suitably controlled in not more than 25 $\mu$m by the grind gauge A method.

The curing coat is formed by painting and baking the above paint composition, besides thickness of the dried film of this coat should be controlled in not more than 10 $\mu$m. The coat of the prepainted steel sheet in EMBODIMENT 2 is intended as a coating design for one-coat thin film, and has a coating capability endurable sufficiently to severe molding process even it is one-coat and has a film thickness of not more than 10 $\mu$m. In addition, thinning of the coat is extremely advantageous in cost performance. Although the minimum of dried film thickness of the coat is not specifically limited, generally it is preferably not less than 2 $\mu$m.

Next, illustrating a method for preparing the one-coat-prepainted steel sheet in EMBODIMENT 2, the prepainted steel sheet in EMBODIMENT 2 is prepared by conducting said chemical conversion treatment on the surface of the zinc-plated steel sheet which is the steel sheet to be painted, followed by painting and baking of said solvent-type-paint composition.

A method for painting the solvent-type-paint composition is not specifically limited, however, the application by a roll coater painting is preferable. After painting the solvent-type-paint composition, the curing coat is obtained by baking the coat by means of heating such as hot-air drying, infrared heating or dielectric heating followed by crosslinking the resin. As for the baking conditions, the short time baking is preferable at 200–250° C. of a baking temperature (a reaching plate temperature) in 20–90 sec of baking time, thereby the curing coat is formed to manufacture a one-coat-prepainted steel sheet.

In this process, when the baking temperature is less than 200° C., the crosslinking reaction does not proceed sufficiently, resulting in failure in giving sufficient coating capability. On the other hand, when the baking temperature exceeds 250° C., deterioration of the coat by heat occurs leading to reduction of the coating capability.

Also when the baking time is less than 20 sec, the crosslinking reaction does not proceed sufficiently, resulting in failure in giving sufficient coating capability. On the other hand, when the baking time exceeds 90 sec, it becomes disadvantageous in terms of manufacturing cost.

The prepainted steel sheet in EMBODIMENT 2 is manufactured by the one-coat-one-baking procedure. For the purpose of enhancing further the corrosion resistance of the prepainted steel sheet, painting of the paint composition on the back of the steel sheet by the similar procedure is preferable.

EXAMPLE

Inventive Examples 1–11 and Comparative Examples 1–12

According to the combination of the composition shown in Tables 10–16, a polyester resin, an epoxy resin, a blocked polyisocyanate, a melamine resin, a curing catalyst, a pigment, a solvent and the like are kneaded and dispersed to prepare the paint composition having a pigment-dispersing degree of not more than 25 μm by the grind gauge A method. In Tables 10–16, the unit of combination amount of each component is "parts by weight". This is parts by weight in a ratio of solid content except for curing catalysts and a solvents. The curing catalyst shows parts by weight of the active component.

Said paint composition was painted and baked on the back side of a fused-zinc-plated steel sheet (plating addition amount: surface/back=30/30 g/m$^2$) having a sheet thickness of 0.4 mm, which had an applying type of chromate chemical conversion treatment, by a bar coater under the conditions shown in Tables 10–15. Subsequently, also on the surface of the steel sheet, the paint composition was painted and baked under the similar condition to that of the back side to give the one-coat-prepainted steel sheets in Inventive Examples 1–11 and Comparative Examples 1–12.

Conventional Example 1

The polyester type primer ("V-NITTO #160 Primer" made by Dai Nippon Toryo Co. Ltd.), which is used for a high workability type prepainted steel sheet (two-coat), was painted and baked on the back side of a fused-zinc-plated steel sheet (plating addition amount: surface/back=30/30 g/m$^2$) having sheet thickness of 0.4 mm, which had had an applying type of chromate chemical conversion treatment, by a bar coater under the conditions shown in Tables 7. Subsequently, the topcoat paint used for a high workability type prepainted steel sheet (two-coat) was painted and baked on this coat. Then, also on the surface of the steel sheet, the polyester primer and the topcoat paint were painted and baked under the similar condition to that of the back side to give the two-coat-prepainted steel sheet in Conventional Example 1.

The various tests were performed using the prepainted steel sheets obtained as the above. Methods for evaluating the tests conducted in the present EXAMPLE are the same as EMBODIMENT 1.

Tables 17 and 18 show the evaluation results of the above each test. According to them, any of the one-coat-prepainted steel sheets of the Inventive Examples have excellent molding workability, appearance, hardness to pencils, processing adhesiveness, solvent-resistance, weather resistance, and corrosion resistance after molding process. Further, sufficient capability is obtained even if baked in a short time and it is understood that this coat is very suitable for fast operation when manufacturing. Furthermore, the prepainted steel sheets of the present invention wherein the thickness of dried film of the coating is not more than 10 μm show almost similar capability to that of the conventional two-coat-prepainted steel sheet of Conventional Example 1 wherein the total thickness of dried films of the primer and the coating is 20 μm.

On the other hand, Comparative Example 1 wherein cyclohexanedimethanol (CHDM) is not used as a polyester resin is inferior in hardness to pencils, processing adhesiveness, solvent-resistance and corrosion resistance after molding process.

Further, Comparative Example 2 wherein an ethylene oxide additive of bisphenol A is introduced to the polyester resin framework instead of cyclohexanedimethanol is inferior in weather resistance.

Also Comparative Example 3 wherein the combination amount of epoxy resin exceeds 25 parts by weight is inferior in workability, processing adhesiveness, weather resistance and corrosion resistance after molding process, and Comparative Example 4 wherein the combination amount of melamine resin exceeds 20 parts by weight is inferior in workability, processing adhesiveness and corrosion resistance after molding process, respectively.

Further, Comparative Example 5 using the polyester resin which has a number-average molecular weight of less than 5000 is inferior in workability, processing adhesiveness and corrosion resistance after molding process, while Comparative Example 6 using the polyester resin which has a glass transition temperature Tg of less than 20° C. is inferior in hardness to pencils, processing adhesiveness and corrosion resistance after molding process, respectively.

Further, Comparative Example 7 using the polyester resin wherein cyclohexanedimethanol is less than 20 mol % is inferior in solvent-resistance and corrosion resistance after molding process.

Further, Comparative Example 8 wherein the thickness of dried film of the coating exceeds 10 μm is low in fast painting, especially inferior in appearance.

Furthermore, Comparative Example 9 wherein the baking temperature is less than 200° C. is inferior in hardness to pencils, processing adhesiveness, solvent-resistance and corrosion resistance after molding process, Comparative Example 10 wherein the baking temperature exceeds 250° C. is inferior in appearance, workability, processing adhesiveness and corrosion resistance after molding process, and Comparative Example 11 wherein the baking time is less than 20 sec is inferior in hardness to pencils, processing adhesiveness, solvent-resistance and corrosion resistance after molding process, respectively.

Herein, *1–*14 in Tables 10–16 mean the following contents.

*1 The polyester resins of No. 1–No. 8 use terephthalic acid, isophthalic acid and adipic acid as polybasic acids, ethylene glycol and CHDM as polyalcohols, respectively. After condensation polymerization of them, the hydroxyl groups were modified by trimellitic anhydride. The polyester resin of No. 9 uses terephthalic acid, isophthalic acid and adipic acid as polybasic acids, ethylene glycol and BPA as polyalcohols, respectively. After condensation polymerization of them, the hydroxyl groups were modified by trimellitic anhydride. The polyester resin of No. 10 uses terephthalic acid, isophthalic acid and sebacic acid as polybasic acids, ethylene glycol-and neopentyl glycol as polyalcohols, respectively, and those were condensed and polymerized.

*2 Mn: number-average molecular weight (measured based on ASTM D-3536-91)

*3 Tg: glass transition temperature (measured based on JIS K 7121 4. 2 (2) [heat flux differential scanning calorimetry]

*4 CHDM: 1,4-cyclohexanedimethanol

*5 BPA: ethylene oxide additive of bisphenol A

*6 Bisphenol A type resin (epoxy equivalents 500)

*7 Methyl ethyl ketone oxime-blocked form of hexamethylenediisocyanate

*8 Methyl etherification

*9 Morpholine-blocked form of dodecylbenzenesufonic acid

*10 Dibutyl tin laurate

*11 Titanium dioxide

*12 Strontium chromate

*13 A mixed solvent composed of 50:40:10 of sorbesso #150, cyclohexanone, and isophorone

*14 Reaching plate temperature

As mentioned above, the prepainted steel sheet in EMBODIMENT 2 is a one-coat-prepainted steel sheet painted directly with a paint composition on the surface of a chemically conversion-treated zinc-plated steel sheet not mediated by a primer, and this plate has excellent molding workability, appearance, coating hardness, processing adhesiveness, solvent-resistance, weather resistance, and corrosion resistance after molding process although the thickness of the coating is not more than 10 μm. Therefore, this is extremely useful as a prepainted steel sheet used for parts where molding process is required in the use of electric appliances and the like.

Moreover, since the prepainted steel sheet of the present invention has the coating thickness of not more than 10 μm in one-coat and is capable of being baked in a short time, more simplicity of painting process, faster operation and more saving of resources become possible leading to extremely industrial usefulness.

TABLE 10

| Polyester *1 | No. | Mn *2 | Tg (° C.) *3 | Hydroxyl value (KOH mg/g) | Acid value (KOH mg/g) | CHDM (mol %) *4 | BPA (mol %) *5 | Example 1 | 2 | 3 | 4 |
|---|---|---|---|---|---|---|---|---|---|---|---|
| | 1 | 15000 | 50 | 5 | 6 | 50 | — | 100 | 100 | 100 | 100 |
| | 2 | 3000 | 50 | 37 | 6 | 50 | — | — | — | — | — |
| | 3 | 10000 | 50 | 9 | 6 | 60 | — | — | — | — | — |
| | 4 | 15000 | 10 | 5 | 6 | 50 | — | — | — | — | — |
| | 5 | 15000 | 70 | 5 | 6 | 30 | — | — | — | — | — |
| | 6 | 15000 | 50 | 7 | 3 | 50 | — | — | — | — | — |
| | 7 | 15000 | 50 | 4 | 9 | 50 | — | — | — | — | — |
| | 8 | 15000 | 50 | 5 | 6 | 10 | — | — | — | — | — |
| | 9 | 15000 | 50 | 5 | 6 | — | 50 | — | — | — | — |
| | 10 | 15000 | 10 | 8 | 0.5 | — | — | — | — | — | — |
| Epoxy resin *6 | | | | | | | | 10 | 20 | 5 | 10 |
| Curing agent | | | | | | | | | | | |
| Blocked polyisocyanate compound *7 | | | | | | | | 6 | 6 | 6 | 6 |
| Melamine resin *8 | | | | | | | | 3 | 3 | 3 | 5 |
| Curing catalyst | | | | | | | | | | | |
| 1 *9 | | | | | | | | 0.5 | 0.5 | 0.5 | 0.5 |
| 2 *10 | | | | | | | | 0.1 | 0.1 | 0.1 | 0.1 |
| Coloring pigment *11 | | | | | | | | 90 | 98 | 87 | 92 |
| Rust preventive pigment *12 | | | | | | | | 5 | 5 | 5 | 5 |
| Solvent *13 | | | | | | | | 262 | 284 | 252 | 266 |
| Painting condition | | | | | | | | | | | |
| Surface | | | | | | | | | | | |
| Coating | | | | | | | | | | | |
| Thickness of drying film (μm) | | | | | | | | 8 | 8 | 8 | 8 |
| Temperature (° C.) *14 | | | | | | | | 240 | 240 | 240 | 240 |
| Baking time (sec) | | | | | | | | 30 | 30 | 30 | 30 |
| Primer | | | | | | | | | | | |
| Thickness of drying film (μm) | | | | | | | | — | — | — | — |
| Temperature (° C.) *14 | | | | | | | | — | — | — | — |
| Baking time (sec) | | | | | | | | — | — | — | — |
| Back | | | | | | | | | | | |
| Coating | | | | | | | | | | | |
| Thickness of drying film (μm) | | | | | | | | 8 | 8 | 8 | 8 |
| Temperature (° C.) *14 | | | | | | | | 220 | 220 | 220 | 220 |
| Baking time (sec) | | | | | | | | 30 | 30 | 30 | 30 |

TABLE 10-continued

| Polyester *1 | No. | Mn *2 | Tg (° C.) *3 | Hydroxyl value (KOH mg/g) | Acid value (KOH mg/g) | CHDM (mol %) *4 | BPA (mol %) *5 | Example 1 | 2 | 3 | 4 |
|---|---|---|---|---|---|---|---|---|---|---|---|
| Primer | | | | | | | | | | | |
| Thickness of drying film (μm) | | | | | | | | — | — | — | — |
| Temperature (° C.) *14 | | | | | | | | — | — | — | — |
| Baking time (sec) | | | | | | | | — | — | — | — |

TABLE 11

| | No. | Mn *2 | Tg (° C.) *3 | Hydroxyl value (KOHmg/g) | Acid value (KOHmg/g) | CHDM (mol %) *4 | BPA (mol %) *5 | Example 5 | 6 | 7 | 8 |
|---|---|---|---|---|---|---|---|---|---|---|---|
| *1 Polyester | | | | | | | | | | | |
| | 1 | 15000 | 50 | 5 | 6 | 50 | — | 100 | 100 | — | — |
| | 2 | 3000 | 50 | 37 | 6 | 50 | — | — | — | — | — |
| | 3 | 10000 | 50 | 9 | 6 | 60 | — | — | — | 100 | — |
| | 4 | 15000 | 10 | 5 | 6 | 50 | — | — | — | — | — |
| | 5 | 15000 | 70 | 5 | 6 | 30 | — | — | — | — | 100 |
| | 6 | 15000 | 50 | 7 | 3 | 50 | — | — | — | — | — |
| | 7 | 15000 | 50 | 4 | 9 | 50 | — | — | — | — | — |
| | 8 | 15000 | 50 | 5 | 6 | 10 | — | — | — | — | — |
| | 9 | 15000 | 50 | 5 | 6 | — | 50 | — | — | — | — |
| | 10 | 15000 | 10 | 8 | 0.5 | — | — | — | — | — | — |
| Epoxy resin | | | | | | *6 | | 10 | 10 | 10 | 10 |
| Curing agent | Blocked polyisocyanate compound | | | | | *7 | | 9 | 18 | 6 | 6 |
| | Melamine resin | | | | | *8 | | — | — | 3 | 3 |
| Curing catalyst | 1 | | | | | *9 | | — | — | 0.5 | 0.5 |
| | 2 | | | | | *10 | | 0.2 | 0.3 | 0.1 | 0.1 |
| Coloring pigment | | | | | | *11 | | 90 | 97 | 90 | 90 |
| Rust preventive pigment | | | | | | *12 | | 5 | 5 | 5 | 5 |
| Solvent | | | | | | *13 | | 262 | 281 | 262 | 262 |
| Painting condition | | | | | | | | | | | |
| Surface | | | | | | | | | | | |
| Coating | Thickness of drying film (μm) | | | | | | | 8 | 8 | 8 | 8 |
| | Temperature (° C.) | | | | | *14 | | 240 | 240 | 240 | 240 |
| | Baking time (sec) | | | | | | | 30 | 30 | 30 | 30 |
| Primer | Thickness of drying film (μm) | | | | | | | — | — | — | — |
| | Temperature (° C.) | | | | | *14 | | — | — | — | — |
| | Baking time (sec) | | | | | | | — | — | — | — |
| Back | | | | | | | | | | | |
| Coating | Thickness of drying film (μm) | | | | | | | 8 | 8 | 8 | 8 |
| | Temperature (μm) | | | | | *14 | | 220 | 220 | 220 | 220 |
| | Baking time (sec) | | | | | | | 30 | 30 | 30 | 30 |
| Primer | Thickness of drying film (μm) | | | | | | | — | — | — | — |
| | Temperature (μm) | | | | | *14 | | — | — | — | — |
| | Baking time (sec) | | | | | | | — | — | — | — |

TABLE 12

| | No. | Mn *2 | Tg (° C.) *3 | Hydroxyl value (KOHmg/g) | Acid value (KOHmg/g) | CHDM (mol %) *4 | BPA (mol %) *5 | Example 9 | 10 | 11 |
|---|---|---|---|---|---|---|---|---|---|---|
| *1 Polyester | | | | | | | | | | |
| | 1 | 15000 | 50 | 5 | 6 | 50 | — | — | — | 100 |
| | 2 | 3000 | 50 | 37 | 6 | 50 | — | — | — | — |
| | 3 | 10000 | 50 | 9 | 6 | 60 | — | — | — | — |
| | 4 | 15000 | 10 | 5 | 6 | 50 | — | — | — | — |
| | 5 | 15000 | 70 | 5 | 6 | 30 | — | — | — | — |
| | 6 | 15000 | 50 | 7 | 3 | 50 | — | 100 | — | — |
| | 7 | 15000 | 50 | 4 | 9 | 50 | — | — | 100 | — |
| | 8 | 15000 | 50 | 5 | 6 | 10 | — | — | — | — |

TABLE 12-continued

| No. | Mn *2 | Tg (° C.) *3 | Hydroxyl value (KOHmg/g) | Acid value (KOHmg/g) | CHDM (mol %) *4 | BPA (mol %) *5 | Example 9 | 10 | 11 |
|---|---|---|---|---|---|---|---|---|---|
| 9 | 15000 | 50 | 5 | 6 | — | 50 | — | — | — |
| 10 | 15000 | 10 | 8 | 0.5 | — | — | — | — | — |
| Epoxy resin | | | | | *6 | | 10 | 10 | 10 |
| Curing agent | | Blocked polyisocyanate compound | | | *7 | | 6 | 6 | 6 |
| | | Melamine resin | | | *8 | | 3 | 3 | 3 |
| Curing catalyst | 1 | | | | *9 | | 0.5 | 0.5 | 0.5 |
| | 2 | | | | *10 | | 0.1 | 0.1 | 0.1 |
| Coloring pigment | | | | | *11 | | 90 | 90 | 90 |
| Rust preventive pigment | | | | | *12 | | 5 | 5 | 5 |
| Solvent | | | | | *13 | | 262 | 262 | 262 |
| Painting condition | | | | | | | | | |
| Surface | | | | | | | | | |
| Coating | | Thickness of drying film (μm) | | | | | 8 | 8 | 5 |
| | | Temperature (° C.) | | | *14 | | 240 | 240 | 240 |
| | | Baking time (sec) | | | | | 30 | 30 | 30 |
| Primer | | Thickness of drying film (μm) | | | | | — | — | — |
| | | Temperature (° C.) | | | *14 | | — | — | — |
| | | Baking time (sec) | | | | | — | — | — |
| Back | | | | | | | | | |
| Coating | | Thickness of drying film (μm) | | | | | 8 | 8 | 5 |
| | | Temperature (μm) | | | *14 | | 220 | 220 | 220 |
| | | Baking time (sec) | | | | | 30 | 30 | 30 |
| Primer | | Thickness of drying film (μm) | | | | | — | — | — |
| | | Temperature (μm) | | | *14 | | — | — | — |
| | | Baking time (sec) | | | | | — | — | — |

TABLE 13

| No. | Mn *2 | Tg (° C.) *3 | Hydroxyl value (KOHmg/g) | Acid value (KOHmg/g) | CHDM (mol %) *4 | BPA (mol %) *5 | Comparative example 1 | 2 | 3 | 4 |
|---|---|---|---|---|---|---|---|---|---|---|
| *1 Polyester | | | | | | | | | | |
| 1 | 15000 | 50 | 5 | 6 | 50 | — | — | — | 100 | 100 |
| 2 | 3000 | 50 | 37 | 6 | 50 | — | — | — | — | — |
| 3 | 10000 | 50 | 9 | 6 | 60 | — | — | — | — | — |
| 4 | 15000 | 10 | 5 | 6 | 50 | — | — | — | — | — |
| 5 | 15000 | 70 | 5 | 6 | 30 | — | — | — | — | — |
| 6 | 15000 | 50 | 7 | 3 | 50 | — | — | — | — | — |
| 7 | 15000 | 50 | 4 | 9 | 50 | — | — | — | — | — |
| 8 | 15000 | 50 | 5 | 6 | 10 | — | — | — | — | — |
| 9 | 15000 | 50 | 5 | 6 | — | 50 | — | 100 | — | — |
| 10 | 15000 | 10 | 8 | 0.5 | — | — | 100 | — | — | — |
| Epoxy resin | | | | | *6 | | 10 | 10 | 30 | 10 |
| Curing agent | | Blocked polyisocyanate compound | | | *7 | | 6 | 6 | 6 | 20 |
| | | Melamine resin | | | *8 | | 3 | 3 | 3 | 10 |
| Curing catalyst | 1 | | | | *9 | | 0.5 | 0.5 | 0.5 | 0.5 |
| | 2 | | | | *10 | | 0.1 | 0.1 | 0.1 | 0.2 |
| Coloring pigment | | | | | *11 | | 90 | 83 | 106 | 106 |
| Rust preventive pigment | | | | | *12 | | 5 | 5 | 5 | 5 |
| Solvent | | | | | *13 | | 262 | 241 | 306 | 307 |
| Painting condition | | | | | | | | | | |
| Surface | | | | | | | | | | |
| Coating | | Thickness of drying film (μm) | | | | | 8 | 8 | 8 | 8 |
| | | Temperature (° C.) | | | *14 | | 240 | 240 | 240 | 240 |
| | | Baking time (sec) | | | | | 30 | 30 | 30 | 30 |
| Primer | | Thickness of drying film (μm) | | | | | — | — | — | — |
| | | Temperature (° C.) | | | *14 | | — | — | — | — |
| | | Baking time (sec) | | | | | — | — | — | — |
| Back | | | | | | | | | | |
| Coating | | Thickness of drying film (μm) | | | | | 8 | 8 | 8 | 8 |
| | | Temperature (μm) | | | *14 | | 220 | 220 | 220 | 220 |
| | | Baking time (sec) | | | | | 30 | 30 | 30 | 30 |

TABLE 13-continued

| No. | Mn *2 | Tg (° C.) *3 | Hydroxyl value (KOHmg/g) | Acid value (KOHmg/g) | CHDM (mol %) *4 | BPA (mol %) *5 | Comparative example 1 | 2 | 3 | 4 |
|---|---|---|---|---|---|---|---|---|---|---|
| Primer | | | Thickness of drying film (μm) | | | | — | — | — | — |
| | | | Temperature (μm) | *14 | | | — | — | — | — |
| | | | Baking time (sec) | | | | — | — | — | — |

TABLE 14

| No. | Mn *2 | Tg (° C.) *3 | Hydroxyl value (KOHmg/g) | Acid value (KOHmg/g) | CHDM (mol %) *4 | BPA (mol %) *5 | Comparative example 5 | 6 | 7 | 8 |
|---|---|---|---|---|---|---|---|---|---|---|
| *1 Polyester | | | | | | | | | | |
| 1 | 15000 | 50 | 5 | 6 | 50 | — | — | — | — | 100 |
| 2 | 3000 | 50 | 37 | 6 | 50 | — | 100 | — | — | — |
| 3 | 10000 | 50 | 9 | 6 | 60 | — | — | — | — | — |
| 4 | 15000 | 10 | 5 | 6 | 50 | — | — | 100 | — | — |
| 5 | 15000 | 70 | 5 | 6 | 30 | — | — | — | — | — |
| 6 | 15000 | 50 | 7 | 3 | 50 | — | — | — | — | — |
| 7 | 15000 | 50 | 4 | 9 | 50 | — | — | — | — | — |
| 8 | 15000 | 50 | 5 | 6 | 10 | — | — | — | 100 | — |
| 9 | 15000 | 50 | 5 | 6 | — | 50 | — | — | — | — |
| 10 | 15000 | 10 | 8 | 0.5 | — | — | — | — | — | — |
| Epoxy resin | | | | | *6 | | 10 | 10 | 10 | 10 |
| Curing agent | | | Blocked polyisocyanate compound | | *7 | | 6 | 6 | 6 | 6 |
| | | | Melamine resin | | *8 | | 3 | 3 | 3 | 3 |
| Curing catalyst | 1 | | | | *9 | | 0.5 | 0.5 | 0.5 | 0.5 |
| | 2 | | | | *10 | | 0.1 | 0.1 | 0.1 | 0.1 |
| Coloring pigment | | | | | *11 | | 90 | 90 | 90 | 90 |
| Rust preventive pigment | | | | | *12 | | 5 | 5 | 5 | 5 |
| Solvent | | | | | *13 | | 262 | 262 | 262 | 262 |
| Painting condition | | | | | | | | | | |
| Surface | | | | | | | | | | |
| Coating | | | Thickness of drying film (μm) | | | | 8 | 8 | 8 | 15 |
| | | | Temperature (° C.) | *14 | | | 240 | 240 | 240 | 240 |
| | | | Baking time (sec) | | | | 30 | 30 | 30 | 30 |
| Primer | | | Thickness of drying film (μm) | | | | — | — | — | — |
| | | | Temperature (° C.) | *14 | | | — | — | — | — |
| | | | Baking time (sec) | | | | — | — | — | — |
| Back | | | | | | | | | | |
| Coating | | | Thickness of drying film (μm) | | | | 8 | 8 | 8 | 15 |
| | | | Temperature (μm) | *14 | | | 220 | 220 | 220 | 220 |
| | | | Baking time (sec) | | | | 30 | 30 | 30 | 30 |
| Primer | | | Thickness of drying film (μm) | | | | — | — | — | — |
| | | | Temperature (μm) | *14 | | | — | — | — | — |
| | | | Baking time (sec) | | | | — | — | — | — |

TABLE 15

| No. | Mn *2 | Tg (° C.) *3 | Hydroxyl value (KOHmg/g) | Acid value (KOHmg/g) | CHDM (mol %) *4 | BPA (mol %) *5 | Comparative example 5 | 6 | 7 | 8 |
|---|---|---|---|---|---|---|---|---|---|---|
| *1 Polyester | | | | | | | | | | |
| 1 | 15000 | 50 | 5 | 6 | 50 | — | 100 | 100 | 100 | 100 |
| 2 | 3000 | 50 | 37 | 6 | 50 | — | — | — | — | — |
| 3 | 10000 | 50 | 9 | 6 | 60 | — | — | — | — | — |
| 4 | 15000 | 10 | 5 | 6 | 50 | — | — | — | — | — |
| 5 | 15000 | 70 | 5 | 6 | 30 | — | — | — | — | — |
| 6 | 15000 | 50 | 7 | 3 | 50 | — | — | — | — | — |
| 7 | 15000 | 50 | 4 | 9 | 50 | — | — | — | — | — |
| 8 | 15000 | 50 | 5 | 6 | 10 | — | — | — | — | — |
| 9 | 15000 | 50 | 5 | 6 | — | 50 | — | — | — | — |
| 10 | 15000 | 10 | 8 | 0.5 | — | — | — | — | — | — |

TABLE 15-continued

| No. | Mn *2 | Tg (° C.) *3 | Hydroxyl value (KOHmg/g) | Acid value (KOHmg/g) | CHDM (mol %) *4 | BPA (mol %) *5 | Comparative example 5 | 6 | 7 | 8 |
|---|---|---|---|---|---|---|---|---|---|---|
| Epoxy resin | | | | | *6 | | 10 | 10 | 10 | 10 |
| Curing agent | | | Blocked polyisocyanate compound | | *7 | | 6 | 6 | 6 | 1 |
| | | | Melamine resin | | *8 | | 3 | 3 | 3 | 9 |
| Curing catalyst | 1 | | | | *9 | | 0.5 | 0.5 | 0.5 | 0.5 |
| | 2 | | | | *10 | | 0.1 | 0.1 | 0.1 | 0.1 |
| Coloring pigment | | | | | *11 | | 90 | 90 | 90 | 90 |
| Rust preventive pigment | | | | | *12 | | 5 | 5 | 5 | 5 |
| Solvent | | | | | *13 | | 262 | 262 | 262 | 262 |
| Painting condition | | | | | | | | | | |
| Surface | | | | | | | | | | |
| Coating | | | Thickness of drying film (μm) | | | | 8 | 8 | 8 | 8 |
| | | | Temperature (° C.) | | *14 | | 180 | 270 | 240 | 240 |
| | | | Baking time (sec) | | | | 30 | 30 | 18 | 30 |
| Primer | | | Thickness of drying film (μm) | | | | — | — | — | — |
| | | | Temperature (° C.) | | *14 | | — | — | — | — |
| | | | Baking time (sec) | | | | — | — | — | — |
| Back | | | | | | | | | | |
| Coating | | | Thickness of drying film (μm) | | | | 8 | 8 | 8 | 8 |
| | | | Temperature (μm) | | *14 | | 180 | 270 | 220 | 220 |
| | | | Baking time (sec) | | | | 30 | 30 | 18 | 30 |
| Primer | | | Thickness of drying film (μm) | | | | — | — | — | — |
| | | | Temperature (μm) | | *14 | | — | — | — | — |
| | | | Baking time (sec) | | | | — | — | — | — |

TABLE 16

| No. | Mn *2 | Tg (° C.) *3 | Hydroxyl value (KOHmg/g) | Acid value (KOHmg/g) | CHDM (mol %) *4 | BPA (mol %) *5 | Conventional example 1 |
|---|---|---|---|---|---|---|---|
| *1 Polyester | | | | | | | |
| 1 | 15000 | 50 | 5 | 6 | 50 | — | — |
| 2 | 3000 | 50 | 37 | 6 | 50 | — | — |
| 3 | 10000 | 50 | 9 | 6 | 60 | — | — |
| 4 | 15000 | 10 | 5 | 6 | 50 | — | — |
| 5 | 15000 | 70 | 5 | 6 | 30 | — | — |
| 6 | 15000 | 50 | 7 | 3 | 50 | — | — |
| 7 | 15000 | 50 | 4 | 9 | 50 | — | — |
| 8 | 15000 | 50 | 5 | 6 | 10 | — | — |
| 9 | 15000 | 50 | 5 | 6 | — | 50 | — |
| 10 | 15000 | 10 | 8 | 0.5 | — | — | 100 |
| Epoxy resin | | | | | *6 | | — |
| Curing agent | | | Blocked polyisocyanate compound | | *7 | | — |
| | | | Melamine resin | | *8 | | 20 |
| Curing catalyst | 1 | | | | *9 | | 0.5 |
| | 2 | | | | *10 | | — |
| Coloring pigment | | | | | *11 | | 91 |
| Rust preventive pigment | | | | | *12 | | 5 |
| Solvent | | | | | *13 | | 264 |
| Painting condition | | | | | | | |
| Surface | | | | | | | |
| Coating | | | Thickness of drying film (μm) | | | | 15 |
| | | | Temperature (° C.) | | *14 | | 240 |
| | | | Baking time (sec) | | | | 60 |
| Primer | | | Thickness of drying film (μm) | | | | 5 |
| | | | Temperature (° C.) | | *14 | | 220 |
| | | | Baking time (sec) | | | | 60 |
| Back | | | | | | | |
| Coating | | | Thickness of drying film (μm) | | | | 15 |
| | | | Temperature (μm) | | *14 | | 220 |
| | | | Baking time (sec) | | | | 60 |
| Primer | | | Thickness of drying film (μm) | | | | 5 |
| | | | Temperature (μm) | | *14 | | 220 |
| | | | Baking time (sec) | | | | 60 |

TABLE 17

| Evaluation and result | Example 1 | 2 | 3 | 4 | 5 | 6 | 7 | 8 | 9 | 10 | 11 |
|---|---|---|---|---|---|---|---|---|---|---|---|
| Appearance | ○ | ○ | ○ | ○ | ○ | ○ | ○ | ○ | ○ | ○ | ○ |
| Gloss degree | 91 | 89 | 87 | 91 | 87 | 90 | 89 | 88 | 88 | 89 | 85 |
| Hardness of pencil | H | H | H | H | H | H | H | H | H | H | H |
| Workability | 1T | 1T | 1T | 1T | 1T | 1T | 1T | 1T | 1T | 1T | 1T |
| Processing adhesion | ○ | ○ | ○ | ○ | ○ | ○ | ○ | ○ | ○ | ○ | ○ |
| Solvent resistance | >50 | >50 | >50 | >50 | >50 | >50 | >50 | >50 | >50 | >50 | >50 |
| Weather resistance | ○ | ○ | ○ | ○ | ○ | ○ | ○ | ○ | ○ | ○ | ○ |
| Corrosion resistance after molding process (1) | ○ | ○ | ○ | ○ | ○ | ○ | ○ | ○ | ○ | ○ | ○ |
| Corrosion resistance after molding process (2) | ○ | ○ | ○ | ○ | ○ | ○ | ○ | ○ | ○ | ○ | ○ |

TABLE 18

| Evaluation and result | Comparative example 1 | 2 | 3 | 4 | 5 | 6 | 7 | 8 | 9 | 10 | 11 | 12 | Conventional example 1 |
|---|---|---|---|---|---|---|---|---|---|---|---|---|---|
| Appearance | ○ | ○ | ○ | ○ | ○ | ○ | ○ | x | ○ | Δ | ○ | ○ | ○ |
| Gloss degree | 88 | 90 | 86 | 88 | 89 | 87 | 85 | 82 | 83 | 79 | 84 | 90 | 91 |
| Hardness of pencil | HB | H | H | H | H | F | H | F | F | H | F | H | HB |
| Workabitity | 1T | 1T | 2T | 2T | 2T | 1T | 1T | 1T | 1T | 2T | 1T | 2T | 1T |
| Processing adhesion | Δ | ○ | Δ | x | Δ | x | ○ | Δ | x | x | x | x | ○ |
| Solvent resistance | 15 | >50 | >50 | >50 | >50 | >50 | 40 | >50 | 30 | >50 | 25 | >50 | >50 |
| Weather resistance | ○ | x | x | ○ | ○ | ○ | ○ | ○ | ○ | ○ | ○ | ○ | ○ |
| Corrosion resistance after molding process (1) | x | ○ | Δ | x | x | Δ | Δ | ○ | x | x | x | ○ | ○ |
| Corrosion resistance after molding process (2) | x | ○ | x | x | Δ | Δ | Δ | ○ | x | x | x | ○ | ○ |

What is claimed is:

1. A one-coat-prepainted steel sheet comprising:
   a chemically conversion-treated zinc-plated steel sheet;
   a one-coat coating having a dried film thickness of not more than 10 μm, the one-coat coating being formed on a surface of said zinc-plated steel sheet;
   said one-coat coating being formed by one-coat-painting and baking of an organic solvent paint composition, the an organic solvent paint composition containing a polyester resin (A) and a melamine resin (D) as main components, the melamine resin (D) being in an amount of 5 to 30 parts by weight relative to 100 parts by weight of the polyester resin (A);
   said polyester resin (A) having a number-average molecular weight of 5000–25000, a glass transition temperature of 20–80° C., a hydroxyl value of 3–30 KOH mg/g and an acid value of 0–10 KOH mg/g; and
   said polyester resin (A) having polyalcohol components, 20–70 mol % of the polyalcohol components being cyclohexanedimethanol.

2. The one-coat-prepainted steel sheet of claim 1, wherein said polyester resin (A) has hydroxyl groups and is obtained from a condensation polymerization of a polybasic acid with a polyalcohol and then modifying a part of the hydroxyl groups with a carboxylic acid to provide an acid value of 3–10 KOH mg/g.

3. The one-coat-prepainted steel sheet of claim 1, wherein said dried film thickness is 2–10 μm.

4. A one-coat-prepainted steel sheet comprising:
   a chemically conversion-treated zinc-plated steel sheet;
   a one-coat coating having a dried film thickness of not more than 10 μm, the one-coat coating being formed on a surface of said zinc-plated steel sheet;
   said one-coat coating being formed by one-coat-painting and baking of an organic solvent paint composition, the an organic solvent paint composition containing a polyester resin (A), an epoxy resin (B) having 180–1000 epoxy equivalents, and a melamine resin (D) as main components, the epoxy resin (B) being in an amount of 5–25 parts by weight, the melamine resin (D) being in an amount of 5–30 parts by weight, relative to 100 parts by weight of the polyester resin (A);
   said polyester resin (A) having a number-average molecular weight of 5000–25000, a glass transition temperature of 20–80° C., a hydroxyl value of 3–30 KOH mg/g and an acid value of 0–10 KOH mg/g; and
   said polyester resin (A) having polyalcohol components, 20–70 mol % of the polyalcohol components being cyclohexanedimethanol.

5. The one-coat-prepainted steel sheet of claim 4, wherein said polyester resin (A) has hydroxyl groups and is obtained from a condensation polymerization of a polybasic acid with a polyalcohol and then modifying a part of the hydroxyl groups with a carboxylic acid to provide an acid value of 3–10 KOH mg/g.

6. The one-coat-prepainted steel sheet as claimed in claim 4, wherein said dried film thickness is 2–10 μm.

7. A method for producing the prepainted steel sheet of claim 1, comprising the steps of:
   painting an organic solvent paint composition on the surface of a chemically conversion-treated zinc-plated steel sheet; and
   forming a curing coating by baking a painted paint composition on said plated steel sheet at 200–250° C. for 20–90 sec.

8. A method for producing the prepainted steel sheet of claim 4, comprising the steps of:
   painting an organic solvent paint composition on the surface of a chemically conversion-treated zinc-plated steel sheet; and forming a curing coat by baking a painted paint composition on said plated steel sheet at 200–250° C. for 20–90 sec.

9. A one-coat-prepainted steel sheet comprising:

a chemically conversion-treated zinc-plated steel sheet;

a one-coat coating having a dried film thickness of not more than 10 μm, the one-coat coating being formed on a surface of said zinc-plated steel sheet;

said one-coat coating being formed by one-coat-painting and baking of an organic solvent paint composition, the an organic solvent paint composition containing a polyester resin (A) and a curing agent as main components, the curing agent being in an amount of 3–20 parts by weight relative to 100 parts by weight of the polyester resin (A);

said curing agent comprising a blocked polyisocyanate compound (C) and a melamine resin (D), wherein a solids content mixing weight ratio (C)/(D) is 100/0–15/85;

said polyester resin (A) having a number-average molecular weight of 5000–25000, a glass transition temperature of 20–80° C., a hydroxyl value of 3–30 KOH mg/g and an acid value of 0–10 KOH mg/g; and said polyester resin (A) having polyalcohol components, 20–70 mol % of the polyalcohol components being cyclohexanedimethanol.

10. The one-coat-prepainted steel sheet of claim 9, wherein said polyester resin (A) has hydroxyl groups and is obtained from a condensation polymerization of a polybasic acid with a polyalcohol and then modifying a part of the hydroxyl groups with a carboxylic acid to provide an acid value of 3–10 KOH mg/g.

11. The one-coat-prepainted steel sheet of claim 9, wherein said dried film thickness is 2–10 μm.

12. A one-coat-prepainted steel sheet comprising:

a chemically conversion-treated zinc-plated steel sheet;

a one-coat coating having a dried film thickness of not more than 10 μm, the one-coat coating being formed on a surface of said zinc-plated steel sheet;

said one-coat coating formed by one-coat-painting and baking of a solvent-type-paint composition, the solvent-type-paint composition containing polyester resin (A), an epoxy resin (B) having 180–1000 epoxy equivalents, and a curing agent as main components, the epoxy resin being in an amount of 5–25 by weight, the curing agent being in an amount of 3–20 parts by weight, relative to 100 parts by weight of the polyester resin (A);

said curing agent containing a blocked polyisocyanate compound (C) and a melamine resin (D), wherein a solids content mixing weight ratio (C)/(D) is 100/0–15/85;

said polyester resin (A) having a number-average molecular weight of 5000–25000, a glass transition temperature of 20–80° C., a hydroxyl value of 3–30 KOH mg/g and an acid value of 0–10 KOH mg/g; and said polyester resin (A) having polyalcohol components, 20–70 mol % of the polyalcohol components being cyclohexanedimethanol.

13. The one-coat-prepainted steel sheet of claim 12, wherein said polyester resin (A) has hydroxyl groups and is obtained from a condensation polymerization of a polybasic acid with a polyalcohol and then modifying a part of the hydroxyl groups with a carboxylic acid to provide an acid value of 3–10 KOH mg/g.

14. The one-coat-prepainted steel sheet of claim 12, wherein said dried film thickness is 2–10 μm.

15. A method for producing the prepainted steel sheet of claim 9, comprising the steps of:

painting an organic solvent paint composition on the surface of a chemically conversion-treated zinc-plated steel sheet; and forming a curing coating by baking a painted paint composition on said plated steel sheet at 200–250° C. for 20–90 sec.

16. A method for producing the prepainted steel sheet of claim 12, comprising the steps of:

painting an organic solvent paint composition on the surface of a chemically conversion-treated zinc-plated steel sheet; and forming a curing coating by baking a painted paint composition on said plated steel sheet at 200–250° C. for 20–90 sec.

17. The one-coat-prepainted steel sheet of claim 1, wherein the number-average molecular weight of the polyester resin (A) is 10000–22000.

18. The one-coat-prepainted steel sheet of claim 4, wherein the number-average molecular weight of the polyester resin (A) is 10000–22000.

19. The one-coat-prepainted steel sheet of claim 9, wherein the number-average molecular weight of the polyester resin (A) is 10000–22000.

20. The one-coat-prepainted steel sheet of claim 12, wherein the number-average molecular weight of the polyester resin (A) is 10000–22000.

* * * * *